(12) United States Patent
Tsai et al.

(10) Patent No.: US 7,986,741 B2
(45) Date of Patent: Jul. 26, 2011

(54) METHOD AND APPARATUS OF IMPROVED CIRCULAR BUFFER RATE MATCHING FOR TURBO-CODED MIMO-OFDM WIRELESS SYSTEMS

(75) Inventors: Jiannan Tsai, Plano, TX (US); Zhouyue Pi, Richardson, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 12/216,519

(22) Filed: Jul. 7, 2008

(65) Prior Publication Data
US 2009/0086849 A1 Apr. 2, 2009

Related U.S. Application Data

(60) Provisional application No. 60/960,448, filed on Sep. 28, 2007.

(51) Int. Cl.
*H04L 5/12* (2006.01)
*H04L 23/02* (2006.01)

(52) U.S. Cl. ........ 375/261; 375/260; 375/264; 375/267; 375/298; 375/299; 455/500; 455/101; 714/702; 714/756; 714/758; 714/794; 714/795

(58) Field of Classification Search .................. 375/261, 375/260, 262, 264, 265, 267, 298, 299, 341, 375/347, 349; 455/500, 101; 714/702, 756, 714/758, 794, 795
See application file for complete search history.

(56) References Cited

U.S. PATENT DOCUMENTS

| | | | | |
|---|---|---|---|---|
| 7,729,447 B2* | 6/2010 | Horng et al. | ......... | 375/299 |
| 7,756,004 B2* | 7/2010 | Ouyang et al. | ......... | 370/208 |
| 2005/0122896 A1* | 6/2005 | Song et al. | ......... | 370/210 |
| 2005/0152267 A1* | 7/2005 | Song et al. | ......... | 370/210 |
| 2007/0086538 A1* | 4/2007 | Ouyang et al. | ......... | 375/267 |
| 2010/0077265 A1* | 3/2010 | Wei et al. | ......... | 714/701 |

FOREIGN PATENT DOCUMENTS

WO  WO 2005/122516 A1  12/2005
WO  WO 2006/020434 A2  2/2006

OTHER PUBLICATIONS

Notification of Transmittal of the International Search Report and the Written Opinion of the International Searching Authority, or the Declaration dated Feb. 26, 2009 in connection with PCT Application No. PCT/KR2008/005714.

\* cited by examiner

*Primary Examiner* — Phuong Phu

(57) ABSTRACT

Methods and apparatus for determining the starting points of redundancy version transmissions in a circular rate matching operation. At least one block of information bits to be transmitted are encoded to generate a plurality of coded bits, which are then segmented into a plurality of sub-blocks of coded bits. Each of the sub-blocks of coded bits is interleaved by using a certain interleaver. The interleaved coded bits of the plurality of sub-blocks are collected and filled into a circular buffer having a plurality of redundancy versions in the circular buffer, with each redundancy version corresponding to a starting bit index in the circular buffer. For each transmission, a subset of bits are selected from the circular buffer by selecting a redundancy version from among the plurality of redundancy version. The selected subset of bits are modulated by using a certain modulation scheme, and are transmitted via at least one antenna. The redundancy versions of the circular being determined such that in at least one pair of redundancy versions, the number of bits between the starting point of a first redundancy version and the starting point of a second redundancy version is not divisible by at least one modulation order.

24 Claims, 16 Drawing Sheets

METHOD AND APPARATUS OF IMPROVED CIRCULAR BUFFER RATE MATCHING FOR TURBO-CODED MIMO-OFDM WIRELESS SYSTEMS

CLAIM OF PRIORITY

This application makes reference to, incorporates the same herein, and claims all benefits accruing under 35 U.S.C. §119 from a provisional application earlier filed in the U.S. Patent & Trademark Office on 28 Sep. 2007 and there duly assigned Ser. No. 60/960,448.

BACKGROUND OF THE INVENTION

1. Field of the Invention

The present invention relates to methods and apparatus for improving circular buffer rate matching process in turbo-coded multiple input and multiple output (MIMO) Orthogonal Frequency Division Multiplexing (OFDM) systems.

2. Description of the Related Art

Evolved Universal Terrestrial Radio Access (E-UTRA) systems have been proposed and developed in a Third Generation Partnership Project Long Term Evolution (3GPP LTE) project. The E-UTRA system would be deployed over any IP network, including the Worldwide Interoperability for Microwave Access (WiMAX) network and the WiFi network, and even wired networks.

The proposed E-UTRA system uses Orthogonal Frequency-Division Multiple Access (OFDMA) for the downlink (base station to user equipment) transmission and Single carrier frequency division multiple access (SC-FDMA) for the uplink transmission, and employs multiple input and multiple output (MIMO) with up to four antennas per station. The channel coding scheme for transport blocks is turbo coding with a contention-free quadratic permutation polynomial (QPP) turbo code internal interleaver.

After the turbo encoding process, a codeword is formed by turbo-encoded bit stream, and a Rate Matching (RM) is performed on the turbo-encoded bit stream to generate a transmission bit stream for each transmission. In the case of retransmission, each retransmission bit stream may be different, depending on the RM algorithm.

Notice that Rate Matching (RM) is basically part of Hybrid Automatic Repeat reQuestion (HARQ) operation. HARQ is widely used in communication systems to combat decoding failure and improve reliability. Each data packet is coded using certain forward error correction (FEC) scheme. Each subpacket may only contains a portion of the coded bits. If the transmission for subpacket k fails, as indicated by a NAK in a feedback acknowledgement channel, a retransmission subpacket, subpacket k+1, is transmitted to help the receiver decode the packet. The retransmission subpackets may contain different coded bits than the previous subpackets. The receiver may softly combine or jointly decode all the received subpackets to improve the chance of decoding. Normally, a maximum number of transmissions is configured in consideration of both reliability, packet delay, and implementation complexity.

A contemporary HARQ operation in turbo-coded wireless systems can be performed with either incremental redundancy (IR) or chase combining. In an IR-based combining with circular buffer rate matching such as E-UTRA HARQ system, Bit Priority Mapping (BMP) issue is directly related to how the starting point of redundancy version of transmission is optimally chosen.

SUMMARY OF THE INVENTION

It is therefore an object of the present invention to provide an improved method and apparatus for transmitting and receiving data in turbo-coded OFDM wireless systems.

It is another object of the present invention to provide an improved method and apparatus to optimally determining the starting point of the redundancy versions for transmission in circular rate-matching/HARQ operation.

According to one aspect of the present invention, at least one block of information bits to be transmitted are encoded to generate a plurality of coded bits, which are then segmented into a plurality of sub-blocks of coded bits. Each of the sub-blocks of coded bits is interleaved by using a certain interleaver. The interleaved coded bits of the plurality of sub-blocks are collected and written into a circular buffer having a plurality of redundancy versions in the circular buffer, with each redundancy version corresponding to a starting bit index in the circular buffer. For each transmission, a subset of bits are selected from the circular buffer by selecting a redundancy version from among the plurality of redundancy versions. The selected subset of bits are modulated by using a certain modulation scheme, and are transmitted via at least one antenna. The redundancy versions of the circular buffer being determined so that in at least one pair of redundancy versions, the number of bits between the starting point of a first redundancy version and the starting point of a second redundancy version is not divisible by at least one modulation order.

Each of the sub-blocks of coded bits may be interleaved by using a row-column interleaver having C columns and R rows. Four redundancy versions may be determined in the circular buffer. The subset of bits may be modulated by using one of a Quadrature phase-shift keying (QPSK) modulation, a 16-Quadrature amplitude modulation (QAM) and a 64-Quadrature amplitude modulation (QAM). Then, the starting bit index of a redundancy version may be established by:

$$RV(j) = R \times ((24 \times j) + 2) + \delta^{RV}(j),$$

where j is the index of the redundancy version, $\delta^{RV}(j)$ is determined such that $\Delta'(j,p) = [R \times (24 \times j + 2)] - [R \times (24 \times p + 2)]$ is not divisible by 4 and 6 for at least one pair of j and p, and j=0, 1, ..., 3, p=0, 1, ..., 3.

When the Quadrature phase-shift keying (QPSK) modulation is used for modulating the subset of bits, $\delta^{RV}(j)$ may be set to be zero. When the 16-Quadrature amplitude modulation (QAM) is used for modulating the subset of bits, and when $\Delta'(j,p)/4$ is an integer number, $\delta^{RV}(j)$ may be set to be 1, 2 or 3; and when $\Delta'(j,p)/4$ is not an integer number, $\delta^{RV}(j)$ may be set to be zero. When the 64-Quadrature amplitude modulation (QAM) is used for modulating the subset of bits and when $\Delta'(j,p)/6$ is an integer number, $\delta^{RV}(j)$ may be set to be 1, 2, 3, 4 or 5; and when $\Delta'(j,p)/6$ is not an integer number, $\delta^{RV}(j)$ may be set to be zero.

Alternatively, $\delta^{RV}(j)$ may be determined in dependence upon the number of dummy bits Y.

Alternatively, the starting bit index of a redundancy version may be established by:

$$RV(j) = R \times ((G \times j) + 2),$$

where j is the index of the redundancy version and j=0, 1, ..., 3, and G is an integer that is not divisible by at least one of 4 and 6.

Still alternatively, a size of the circular buffer may be determined to be a number that is not divisible by at least one modulation order.

According to another aspect of the present invention, a plurality of blocks of data bits are received via at least one antenna. The plurality of blocks of data bits are de-modulated by using a certain modulation scheme, and are then written into a circular buffer, with each block of de-modulated bits being written in accordance with a redundancy version selected from among a plurality of redundancy versions. The bits written into the circular buffer are segmented into a plurality of sub-blocks of bits. Each of the sub-blocks of bits is interleaved by using a certain interleaver. The interleaved bits are collected from the plurality of sub-blocks to generate a collected block of bits. Finally, the collected block of bits is decoded by using a certain decoding scheme. The redundancy versions of the circular being determined such that in at least one pair of redundancy versions, the number of bits between the starting point of a first redundancy version and the starting point of a second redundancy version being not divisible by at least one modulation order.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
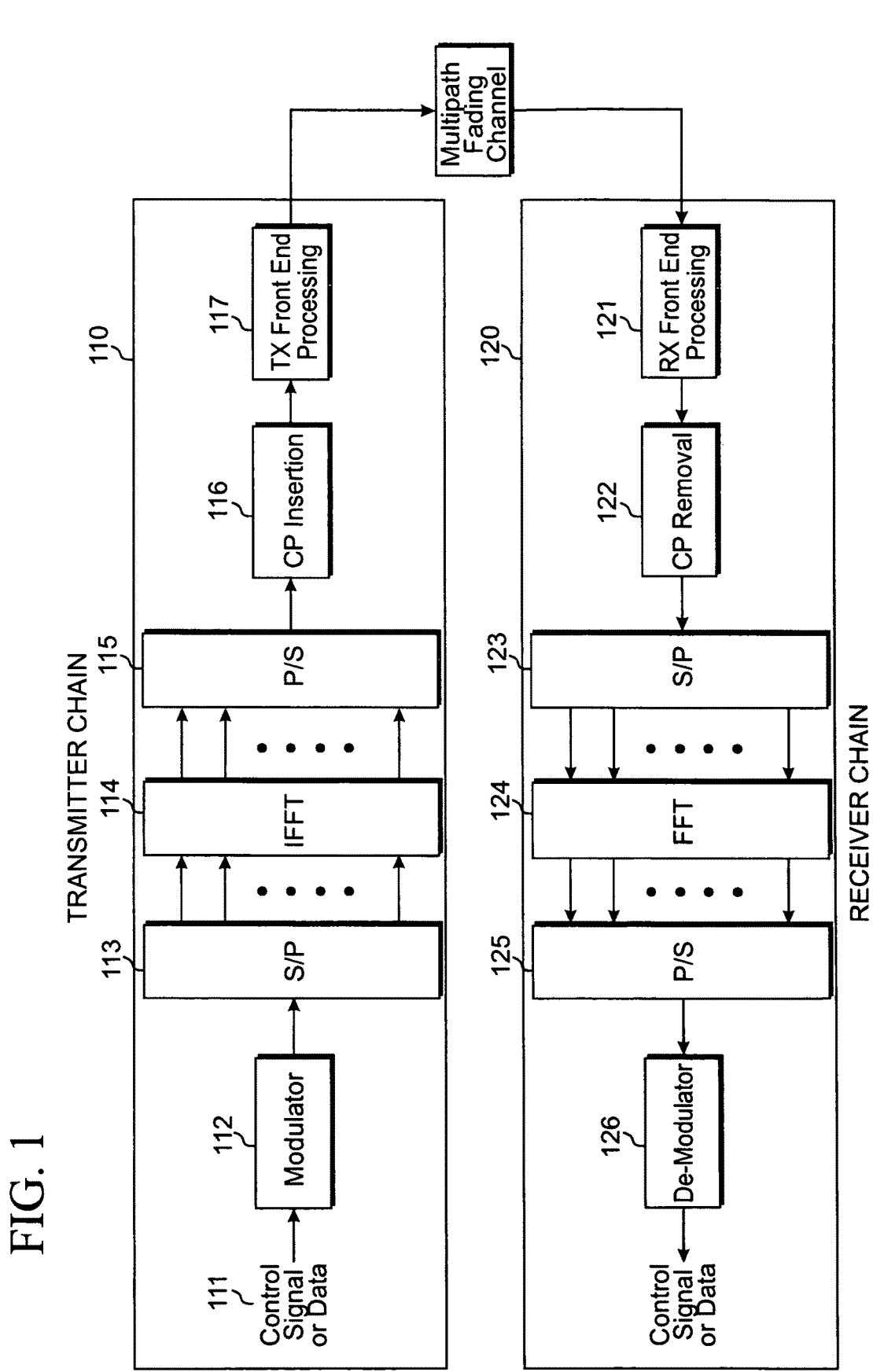
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulation symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 2:
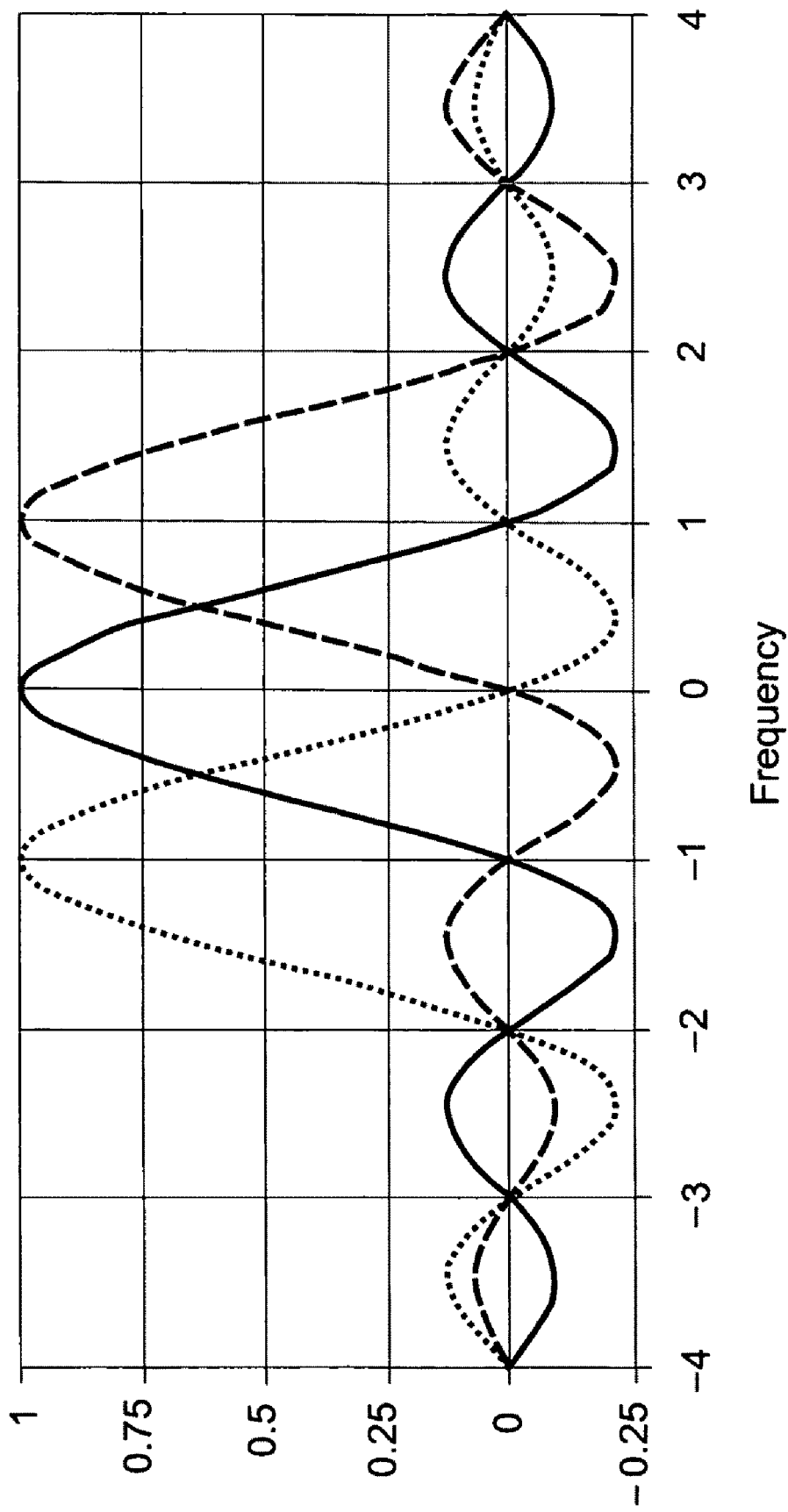
FIG. 2 is two coordinate graphs of OFDM subcarriers showing amplitude as a function of frequency.

In an OFDM system, each OFDM symbol consists of multiple sub-carriers. Each sub-carrier within an OFDM symbol carriers a modulation symbol. FIG. 2 illustrates the OFDM transmission scheme using sub-carrier 1, sub-carrier 2, and sub-carrier 3. Because each OFDM symbol has finite duration in time domain, the sub-carriers overlap with each other in frequency domain. The orthogonality is maintained at the sampling frequency assuming the transmitter and the receiver has perfect frequency synchronization, as shown in FIG. 2. In the case of frequency offset due to imperfect frequency synchronization or high mobility, the orthogonality of the sub-carriers at sampling frequencies is destroyed, resulting in inter-carrier-interference (ICI).

Figure 3:
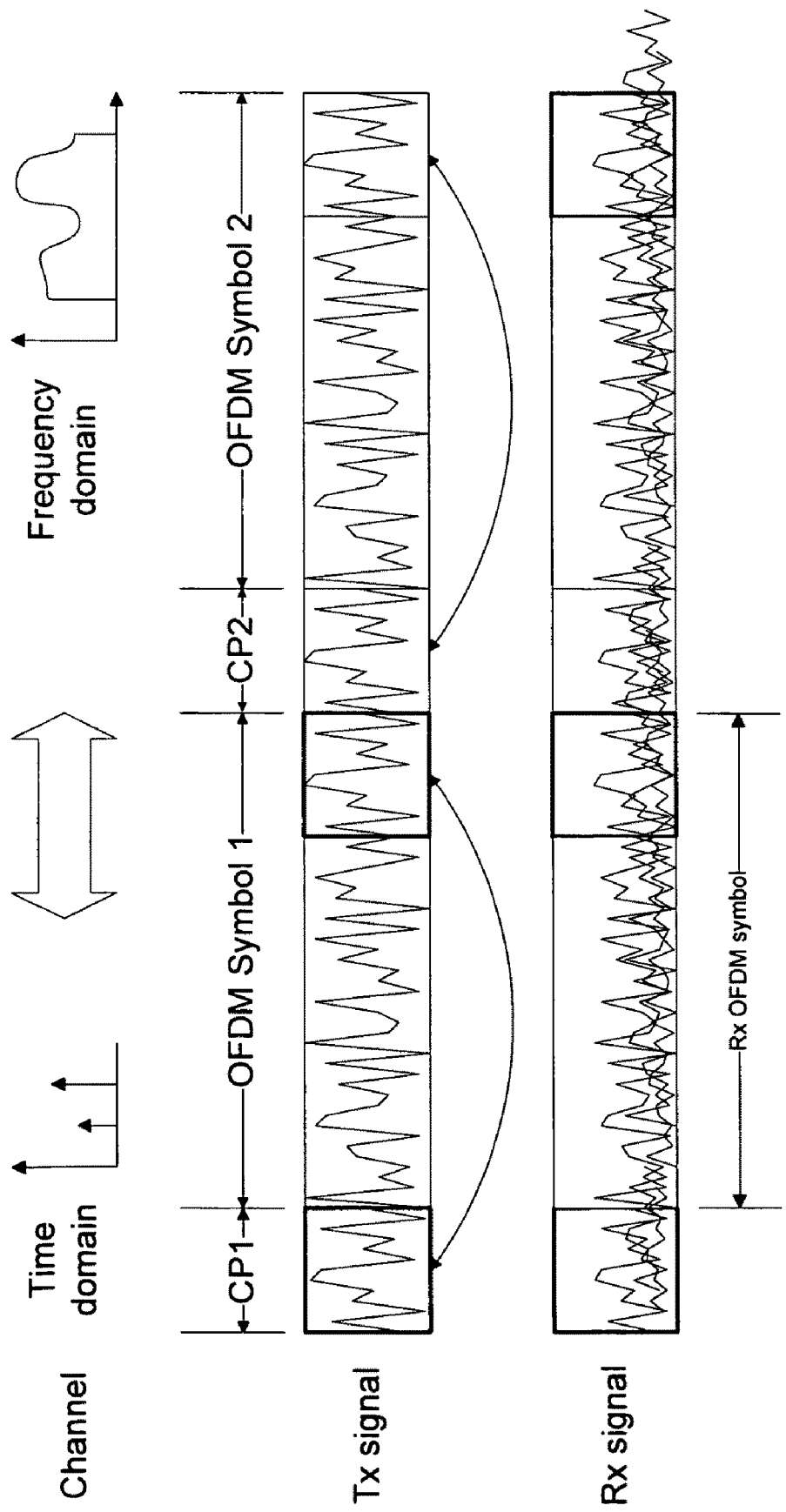
FIG. 3 is an illustration of the transmitted and received waveforms for OFDM symbols in a time domain.

A time domain illustration of the transmitted and received OFDM symbols is shown in FIG. 3. Due to multipath fading, the CP portion of the received signal is often corrupted by the previous OFDM symbol. As long as the CP is sufficiently long, however, the received OFDM symbol without CP should only contain its own signal convoluted by the multipath fading channel. In general, a Fast Fourier Transform (FFT) is taken at the receiver side to allow further processing frequency domain. The advantage of OFDM over other transmission schemes is its robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwidth, it experiences a single path fading. Simple equalization scheme can be used to combat frequency selection fading.

Figure 4:
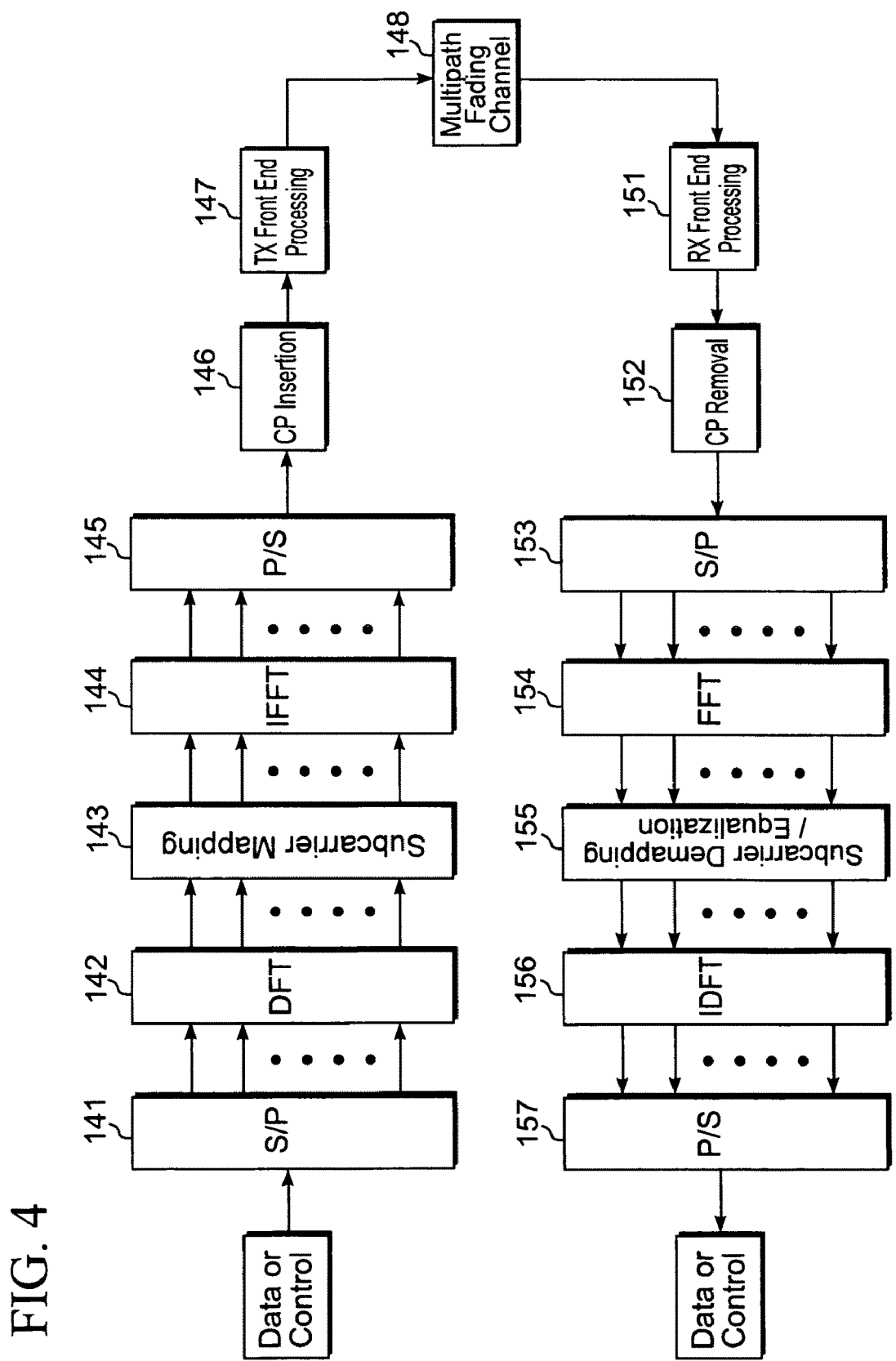
FIG. 4 is an illustration of a single carrier frequency division multiple access transceiver chain.

Single carrier frequency division multiple access (SC-FDMA), which utilizes single carrier modulation and frequency domain equalization is a technique that has similar performance and complexity as those of an OFDMA system. One advantage of SC-FDMA is that the SC-FDMA signal has lower peak-to-average power ratio (PAPR) because of its inherent single carrier structure. Low PAPR normally results in high efficiency of power amplifier, which is particularly important for mobile stations in uplink transmission. SC-FDMA is selected as the uplink multiple access scheme in the Third Generation Partnership Project (3GPP) long term evolution (LTE). An example of the transceiver chain for SC-FDMA is shown in FIG. 4. At the transmitter side, the data or control signal is serial to parallel (S/P) converted by a S/P converter 181. Discrete Fourier transform (DFT) will be applied to time-domain data or control signal by a DFT transformer 182 before the time-domain data is mapped to a set of sub-carriers by a sub-carrier mapping unit 183. To ensure low PAPR, normally the DFT output in the frequency domain will be mapped to a set of contiguous sub-carriers. Then IFFT, normally with larger size than the DFT, will be applied by an IFFT transformer 184 to transform the signal back to time domain. After parallel to serial (P/S) conversion by a P/S/ converter 185, cyclic prefix (CP) will be added by a CP insertion unit 186 to the data or the control signal before the data or the control signal is transmitted to a transmission front end processing unit 187. The processed signal with a cyclic prefix added is often referred to as a SC-FDMA block. After the signal passes through a communication channel 188, e.g., a multipath fading channel in a wireless communication system, the receiver will perform receiver front end processing by a receiver front end processing unit 191, remove the CP by a CP removal unit 192, apply FFT by a FFT transformer 194 and frequency domain equalization. Inverse Discrete Fourier transform (IDFT) 196 will be applied after the equalized signal is de-mapped 195 in frequency domain. The output of IDFT will be passed for further time-domain processing such as demodulation and decoding.

Figure 5:
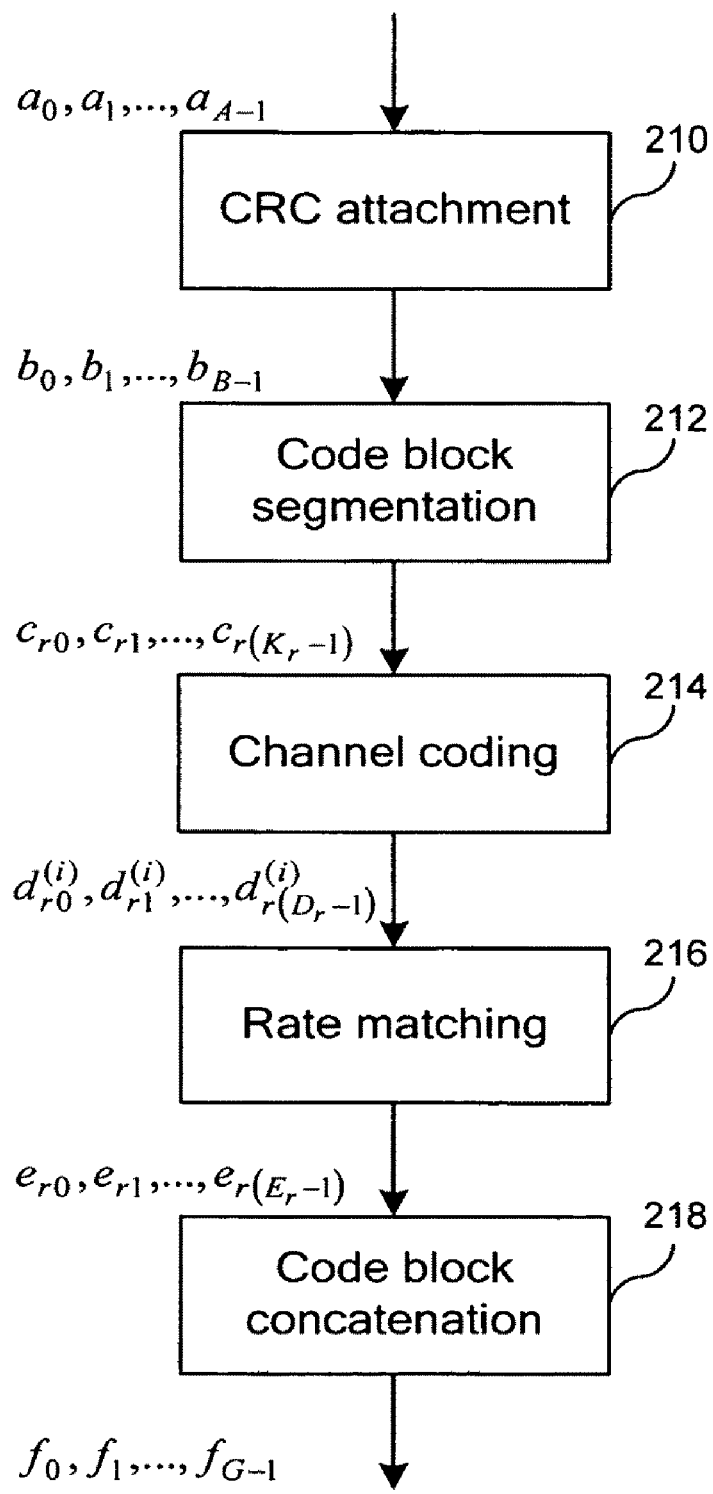
FIG. 5 schematically illustrates a coding chain for turbo-coded Evolved Universal Terrestrial Radio Access (E-UTRA) downlink systems.
Figure 6:
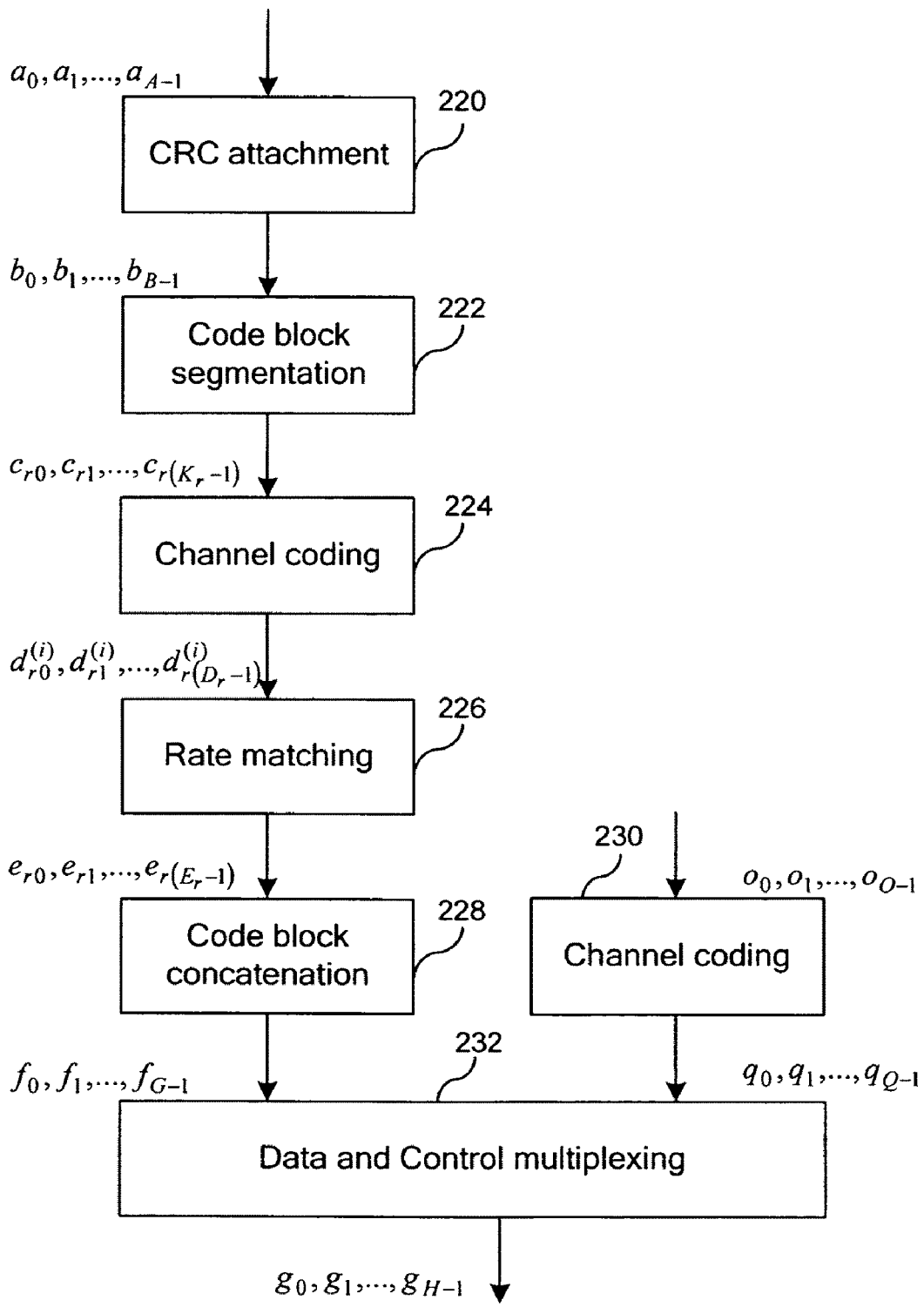
FIG. 6 schematically illustrates a coding chain for turbo-coded Evolved Universal Terrestrial Radio Access (E-UTRA) uplink systems.

The downlink and uplink turbo coding chain in an Evolved Universal Terrestrial Radio Access (E-UTRA) system are show in FIG. 5 and FIG. 6, respectively. In the E-UTRA down link system as shown in FIG. 5, the information bit streams $a_0, a_1, a_2, a_3, \ldots, a_{A-1}$ are basically coming from upper layer of transport channel, which is sent to the coding chain block by block. Typically, this bit stream is denoted as a transport block. A cyclic redundancy check (CRC) may be generated for the whole transport block for the purpose of error detection for that block (step 210). The bit stream in the transport block attached with the CRC is denoted as $b_0, b_1, \ldots, b_{B-1}$. When a transport block is large, the transport block is segmented into multiple code blocks so that multiple coded packets can be generated, which is advantageous because of benefits such as enabling parallel processing or pipelining implementation and flexible trade off between power consumption and hardware complexity. The bit stream in an r-th code block having a size $K_r$ is denoted as $c_{r0}, c_{r1}, \ldots, c_{r(K_r-1)}$. The bits are then encoded using a turbo encoding process (step 214). As an example, the turbo encoding process of the E-UTRA system is illustrated in the FIG. 7. Notice that this turbo encoding process are generally used, for example, downlink physical shared channel (DL-SCH). In the DL-SCH design, one 24-bit CRC is generated for the whole transport block for the purpose of error detection for that block. The E-UTRA uplink system as shown in FIG. 6 is similar to the E-UTRA uplink system downlink system, except that a step of channel coding (step 230) and a step of data and control multiplexing step (step 232) need to be performed before the signal is transmitted.

Figure 7:
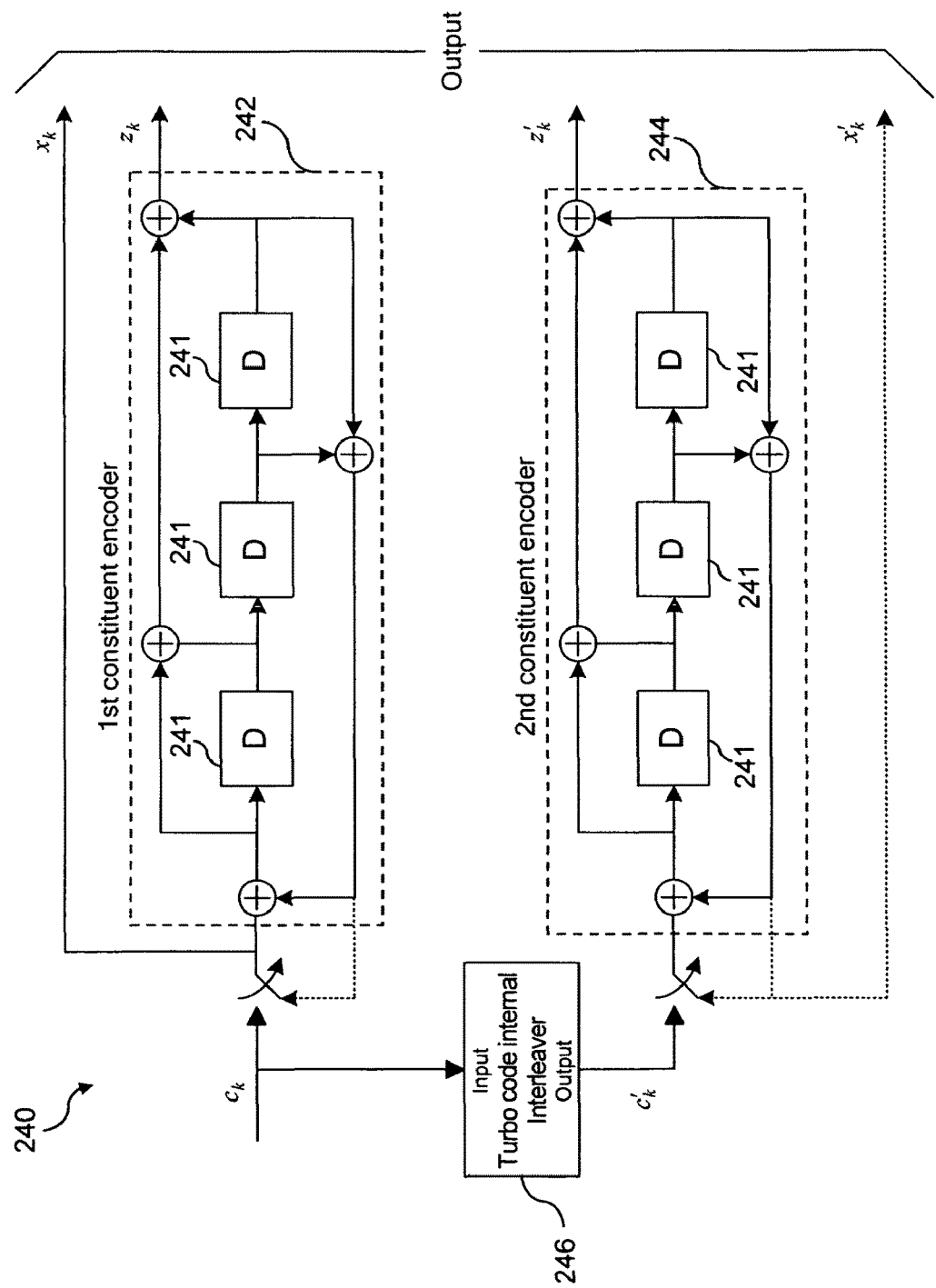
FIG. 7 schematically illustrates the structure of a rate ⅓ turbo encoder.

FIG. 7 schematically illustrates the structure of a turbo encoder 240. Turbo encoder 240 uses Parallel Concatenated Convolutional Code (PCCC) with two 8-state constituent encoders 242, 244 and one turbo code internal interleaver 246. Each of the 8-state constituent encoder is constructed with three shift registers 241. The coding rate of turbo encoder is ⅓.

The transfer function of the 8-state constituent encoder for the PCCC is:

$$G(D) = \left[1, \frac{g_1(D)}{g_0(D)}\right], \quad (1)$$

where:

$$g_0(D) = 1 + D^2 + D^3,$$
$$g_1(D) = 1 + D + D^3.$$

The initial value of shift registers 241 of first and second 8-state constituent encoders 242, 244 shall be all zeros when starting to encode the input bits. The output from the turbo encoder is:

$$d_k^{(0)} = x_k \quad (2)$$

$$d_k^{(1)} = z_k \quad (3)$$

$$d_k^{(2)} = z_k' \quad (4)$$

for $k=0, 1, 2, \ldots, K-1$.

If the code block to be encoded is the 0-th code block and the number of filler bits is greater than zero, i.e., F>0, then the encoder shall set $c_k=0, k=0, \ldots, (F-1)$ at its input and shall set $d_k^{(0)}=<\text{NULL}>$, $k=0, \ldots, (F-1)$ and $d_k^{(1)}=<\text{NULL}>$, $k=0, \ldots, (F-1)$ at its output.

The bits input to turbo encoder 240 are denoted by $c_0, c_1, c_2, c_3, \ldots, c_{K-1}$, and the bits output from the first and second 8-state constituent encoders 242, 244 are denoted by $z_0, z_1, z_2, z_3, \ldots, z_{K-1}$ and $z_0', z_1', z_2', z_3', \ldots, z_{K-1}'$, respectively. The bits input to turbo code internal interleaver 246 are denoted by $c_0, c_1, \ldots, c_{K-1}$, where K is the number of input bits. The bits output from turbo code internal interleaver 246 are denoted by $c_0', c_1', \ldots, c_{K-1}'$, and these bits are to be input into second 8-state constituent encoder 244.

Trellis termination is performed by taking the tail bits from the shift register feedback after all information bits are encoded. Tail bits are padded after the encoding of information bits.

The first three tail bits shall be used to terminate the first constituent encoder (upper switch of FIG. 7 in lower position) while the second constituent encoder is disabled. The last three tail bits shall be used to terminate the second constituent encoder (lower switch of FIG. 7 in lower position) while the first constituent encoder is disabled.

The transmitted bits for trellis termination shall then be:

$$d_K^{(0)}=x_K, d_{K+1}^{(0)}=z_{K+1}, d_{K+2}^{(0)}=x_K', d_{K+3}^{(0)}=z_{K+1}' \quad (5)$$

$$d_K^{(1)}=z_K, d_{K+1}^{(1)}=x_{K+2}, d_{K+2}^{(1)}=z_K', d_{K+3}^{(1)}=x_{K+2}' \quad (6)$$

$$d_K^{(2)}=x_{K+1}, d_{K+1}^{(2)}=z_{K+2}, d_{K+2}^{(2)}=x_{K+1}', d_{K+3}^{(2)}=z_{K+2}' \quad (7)$$

As an example, a quadratic permutation polynomial (QPP) internal interleaver is used for illustration. The relationship between the input and output bits for a QPP internal interleaver is as follows:

$$c_i' = c_{\Pi(i)}, i=0,1,\ldots,(K-1), \quad (8)$$

where the block size $K \geq 40$, and $K=8\times(4m+j)$, j can be chosen from the set of $\{1, 2, 3, 4\}$ and m can be chosen from the set of $\{1, 2, \ldots, 191\}$, and the relationship between the output index i and the input index $\Pi(i)$ satisfies the following quadratic form:

$$\Pi(i)=(f_1 \cdot i + f_2 \cdot i^2) \bmod K \quad (9)$$

where the parameters $f_1$ and $f_2$ depend on the block size K and are summarized in following Table 1.

TABLE 1

Turbo code internal interleaver parameters

| i | $K_i$ | $f_1$ | $f_2$ |
|---|---|---|---|
| 1 | 40 | 3 | 10 |
| 2 | 48 | 7 | 12 |
| 3 | 56 | 19 | 42 |
| 4 | 64 | 7 | 16 |
| 5 | 72 | 7 | 18 |
| 6 | 80 | 11 | 20 |
| 7 | 88 | 5 | 22 |
| 8 | 96 | 11 | 24 |
| 9 | 104 | 7 | 26 |
| 10 | 112 | 41 | 84 |
| 11 | 120 | 103 | 90 |
| 12 | 128 | 15 | 32 |
| 13 | 136 | 9 | 34 |
| 14 | 144 | 17 | 108 |
| 15 | 152 | 9 | 38 |
| 16 | 160 | 21 | 120 |
| 17 | 168 | 101 | 84 |
| 18 | 176 | 21 | 44 |
| 19 | 184 | 57 | 46 |
| 20 | 192 | 23 | 48 |
| 21 | 200 | 13 | 50 |
| 22 | 208 | 27 | 52 |
| 23 | 216 | 11 | 36 |
| 24 | 224 | 27 | 56 |
| 25 | 232 | 85 | 58 |
| 26 | 240 | 29 | 60 |
| 27 | 248 | 33 | 62 |
| 28 | 256 | 15 | 32 |
| 29 | 264 | 17 | 198 |
| 30 | 272 | 33 | 68 |
| 31 | 280 | 103 | 210 |
| 32 | 288 | 19 | 36 |
| 33 | 296 | 19 | 74 |
| 34 | 304 | 37 | 76 |
| 35 | 312 | 19 | 78 |
| 36 | 320 | 21 | 120 |
| 37 | 328 | 21 | 82 |
| 38 | 336 | 115 | 84 |
| 39 | 344 | 193 | 86 |
| 40 | 352 | 21 | 44 |
| 41 | 360 | 133 | 90 |
| 42 | 368 | 81 | 46 |
| 43 | 376 | 45 | 94 |
| 44 | 384 | 23 | 48 |
| 45 | 392 | 243 | 98 |
| 46 | 400 | 151 | 40 |
| 47 | 408 | 155 | 102 |
| 48 | 416 | 25 | 52 |
| 49 | 424 | 51 | 106 |
| 50 | 432 | 47 | 72 |
| 51 | 440 | 91 | 110 |
| 52 | 448 | 29 | 168 |
| 53 | 456 | 29 | 114 |
| 54 | 464 | 247 | 58 |
| 55 | 472 | 29 | 118 |
| 56 | 480 | 89 | 180 |
| 57 | 488 | 91 | 122 |
| 58 | 496 | 157 | 62 |
| 59 | 504 | 55 | 84 |
| 60 | 512 | 31 | 64 |
| 61 | 528 | 17 | 66 |
| 62 | 544 | 35 | 68 |
| 63 | 560 | 227 | 420 |
| 64 | 576 | 65 | 96 |
| 65 | 592 | 19 | 74 |
| 66 | 608 | 37 | 76 |
| 67 | 624 | 41 | 234 |
| 68 | 640 | 39 | 80 |
| 69 | 656 | 185 | 82 |
| 70 | 672 | 43 | 252 |
| 71 | 688 | 21 | 86 |
| 72 | 704 | 155 | 44 |
| 73 | 720 | 79 | 120 |
| 74 | 736 | 139 | 92 |
| 75 | 752 | 23 | 94 |
| 76 | 768 | 217 | 48 |
| 77 | 784 | 25 | 98 |
| 78 | 800 | 17 | 80 |
| 79 | 816 | 127 | 102 |
| 80 | 832 | 25 | 52 |
| 81 | 848 | 239 | 106 |
| 82 | 864 | 17 | 48 |
| 83 | 880 | 137 | 110 |
| 84 | 896 | 215 | 112 |
| 85 | 912 | 29 | 114 |
| 86 | 928 | 15 | 58 |
| 87 | 944 | 147 | 118 |
| 88 | 960 | 29 | 60 |
| 89 | 976 | 59 | 122 |
| 90 | 992 | 65 | 124 |
| 91 | 1008 | 55 | 84 |
| 92 | 1024 | 31 | 64 |
| 93 | 1056 | 17 | 66 |
| 94 | 1088 | 171 | 204 |
| 95 | 1120 | 67 | 140 |
| 96 | 1152 | 35 | 72 |
| 97 | 1184 | 19 | 74 |
| 98 | 1216 | 39 | 76 |
| 99 | 1248 | 19 | 78 |
| 100 | 1280 | 199 | 240 |
| 101 | 1312 | 21 | 82 |
| 102 | 1344 | 211 | 252 |
| 103 | 1376 | 21 | 86 |
| 104 | 1408 | 43 | 88 |
| 105 | 1440 | 149 | 60 |
| 106 | 1472 | 45 | 92 |
| 107 | 1504 | 49 | 846 |
| 108 | 1536 | 71 | 48 |
| 109 | 1568 | 13 | 28 |
| 110 | 1600 | 17 | 80 |
| 111 | 1632 | 25 | 102 |
| 112 | 1664 | 183 | 104 |
| 113 | 1696 | 55 | 954 |
| 114 | 1728 | 127 | 96 |
| 115 | 1760 | 27 | 110 |
| 116 | 1792 | 29 | 112 |
| 117 | 1824 | 29 | 114 |
| 118 | 1856 | 57 | 116 |
| 119 | 1888 | 45 | 354 |
| 120 | 1920 | 31 | 120 |
| 121 | 1952 | 59 | 610 |
| 122 | 1984 | 185 | 124 |
| 123 | 2016 | 113 | 420 |
| 124 | 2048 | 31 | 64 |
| 125 | 2112 | 17 | 66 |
| 126 | 2176 | 171 | 136 |
| 127 | 2240 | 209 | 420 |
| 128 | 2304 | 253 | 216 |
| 129 | 2368 | 367 | 444 |
| 130 | 2432 | 265 | 456 |
| 131 | 2496 | 181 | 468 |
| 132 | 2560 | 39 | 80 |
| 133 | 2624 | 27 | 164 |
| 134 | 2688 | 127 | 504 |
| 135 | 2752 | 143 | 172 |
| 136 | 2816 | 43 | 88 |
| 137 | 2880 | 29 | 300 |
| 138 | 2944 | 45 | 92 |
| 139 | 3008 | 157 | 188 |
| 140 | 3072 | 47 | 96 |
| 141 | 3136 | 13 | 28 |
| 142 | 3200 | 111 | 240 |
| 143 | 3264 | 443 | 204 |
| 144 | 3328 | 51 | 104 |
| 145 | 3392 | 51 | 212 |
| 146 | 3456 | 451 | 192 |
| 147 | 3520 | 257 | 220 |
| 148 | 3584 | 57 | 336 |
| 149 | 3648 | 313 | 228 |
| 150 | 3712 | 271 | 232 |
| 151 | 3776 | 179 | 236 |
| 152 | 3840 | 331 | 120 |

TABLE 1-continued

Turbo code internal interleaver parameters

| i | $K_i$ | $f_1$ | $f_2$ |
|---|---|---|---|
| 153 | 3904 | 363 | 244 |
| 154 | 3968 | 375 | 248 |
| 155 | 4032 | 127 | 168 |
| 156 | 4096 | 31 | 64 |
| 157 | 4160 | 33 | 130 |
| 158 | 4224 | 43 | 264 |
| 159 | 4288 | 33 | 134 |
| 160 | 4352 | 477 | 408 |
| 161 | 4416 | 35 | 138 |
| 162 | 4480 | 233 | 280 |
| 163 | 4544 | 357 | 142 |
| 164 | 4608 | 337 | 480 |
| 165 | 4672 | 37 | 146 |
| 166 | 4736 | 71 | 444 |
| 167 | 4800 | 71 | 120 |
| 168 | 4864 | 37 | 152 |
| 169 | 4928 | 39 | 462 |
| 170 | 4992 | 127 | 234 |
| 171 | 5056 | 39 | 158 |
| 172 | 5120 | 39 | 80 |
| 173 | 5184 | 31 | 96 |
| 174 | 5248 | 113 | 902 |
| 175 | 5312 | 41 | 166 |
| 176 | 5376 | 251 | 336 |
| 177 | 5440 | 43 | 170 |
| 178 | 5504 | 21 | 86 |
| 179 | 5568 | 43 | 174 |
| 180 | 5632 | 45 | 176 |
| 181 | 5696 | 45 | 178 |
| 182 | 5760 | 161 | 120 |
| 183 | 5824 | 89 | 182 |
| 184 | 5888 | 323 | 184 |
| 185 | 5952 | 47 | 186 |
| 186 | 6016 | 23 | 94 |
| 187 | 6080 | 47 | 190 |
| 188 | 6144 | 263 | 480 |

Turning back to FIG. 5, after the turbo encoding process, a codeword is formed by turbo-encoded bit stream $d_0^{(i)}$, $d_1^{(i)}$, $d_2^{(i)}$, $d_3^{(i)}$, . . . , $d_{D-1}^{(i)}$. A Rate Matching (RM) process is performed on the turbo-encoded bit stream to genetare a transmission bit stream for each transmission (step 216). In the case of retransmission, each retransmission bit stream may be different, depending on the RM algorithm.

Figure 8:
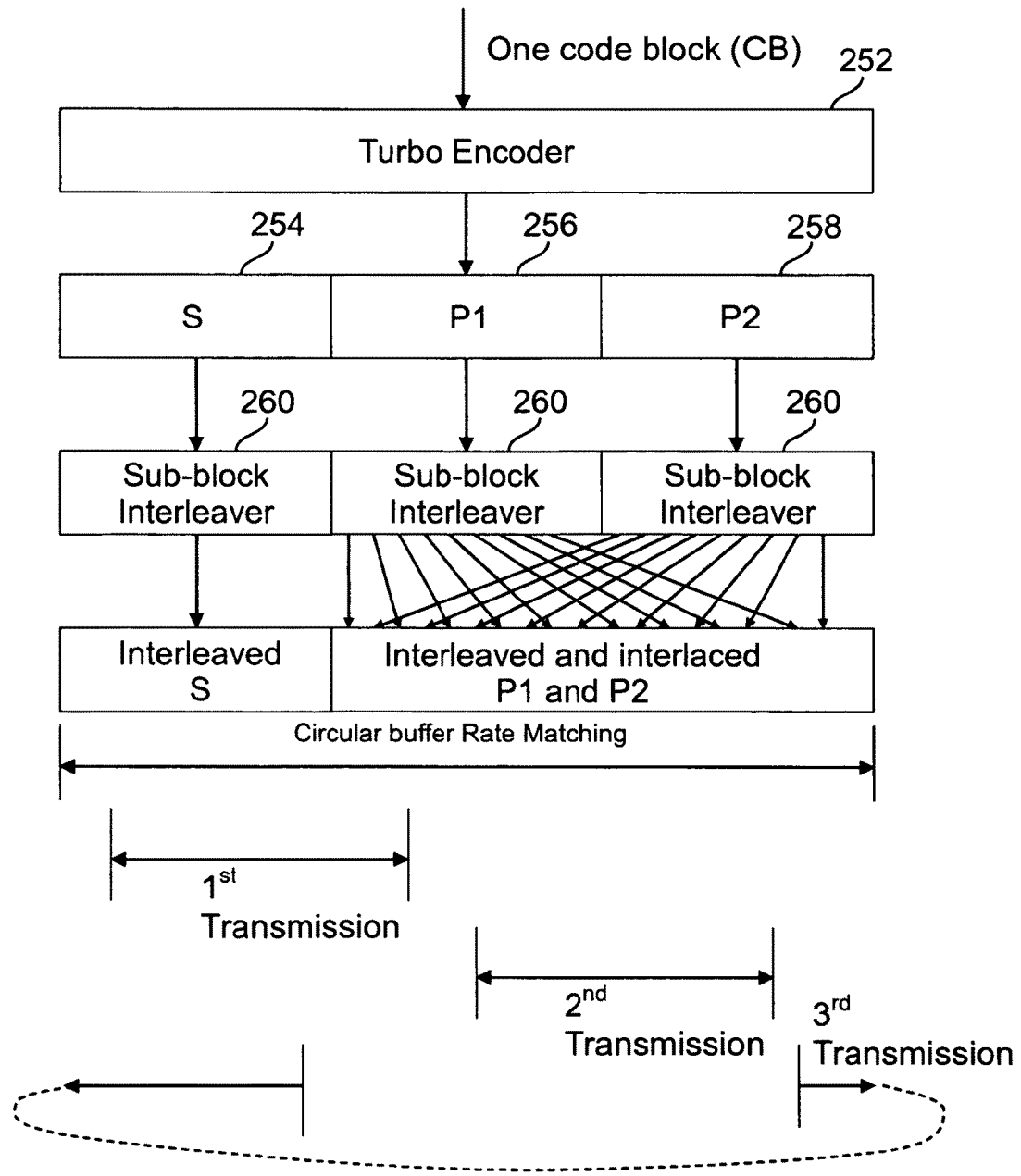
FIG. 8 schematically illustrates a circular buffer based rate matching (RM) operation.

A circular buffer based rate matching scheme has been proposed to E-UTRA system design. The idea is illustrated in FIG. 8. In this example, information bits are encoded by a turbo encoder 252 with a rate ⅓ turbo code, which generates a stream of systematic bits (S) 254, a stream of parity bits from the first constituent convolutional code (P1) 256, and a stream of parity bits from the second constituent convolutional code (P2) 258. Each of these three streams will be interleaved by a sub-block interleaver 260. The interleaved parity bits P1 256 and parity bits P2 258 are then interlaced. In other words, the parity bits are written in a buffer in the order of $P_{11}$, $P_{21}$, $P_{12}$, $P_{22}$, . . . , where $P_{11}$ is the first bit of the interleaved Parity 1 bits, $P_{21}$ is the first bit of the interleaved Parity 2 bits, $P_{12}$ is the second bit of the interleaved Parity 1 bits, $P_{22}$ is the second bit of the interleaved Parity 2 bits, etc. During the rate matching procedure, for each transmission, the transmitter reads bits from the buffer, starting from an offset position and increasing or decreasing the bit index. If the bit index reaches a certain maximum number, the bit index is reset to the first bit in the buffer. In other words, the buffer is circular. Note the size of the circular buffer needs not necessarily be the total number of coded bits at the encoder output. For example, as shown in FIG. 8, the circular buffer size is smaller than the number of coded bits at the encoder output. This allows a simple implementation of first rate matching to reduce the requirement of retransmission buffer size.

Figure 9:
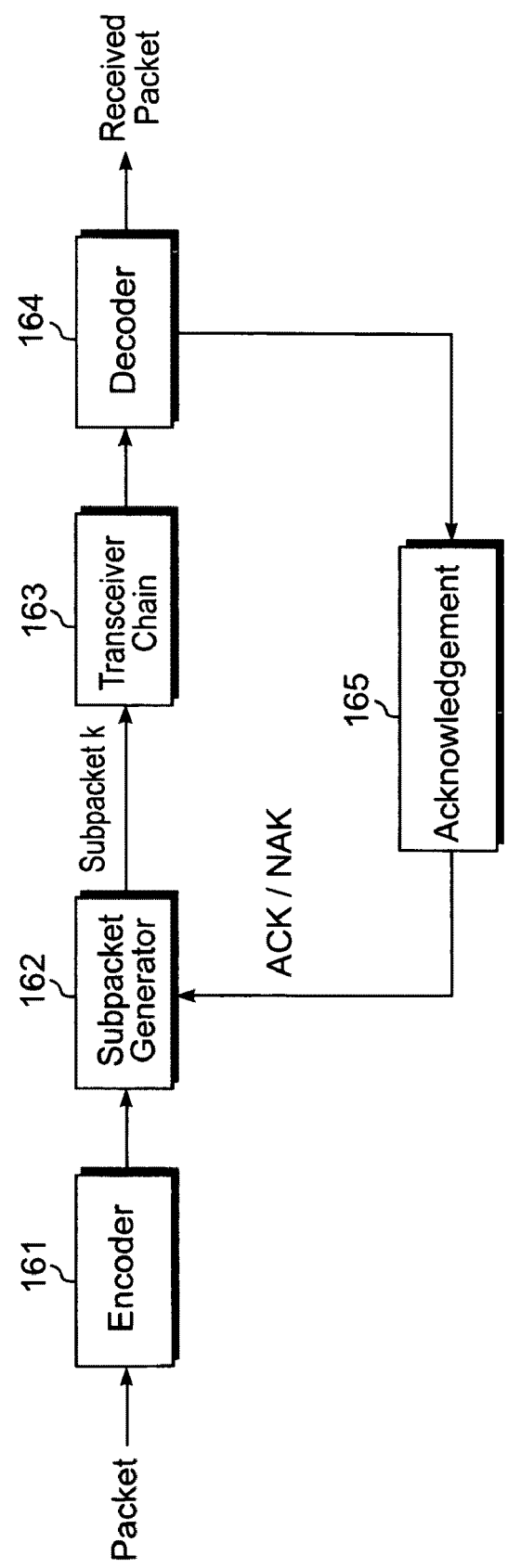
FIG. 9 schematically illustrates a Hybrid Automatic Repeat reQuestion (HARQ) operation.

Notice that RM is basically part of Hybrid Automatic Repeat reQuestion (HARQ) operation. HARQ is widely used in communication systems to combat decoding failure and improve reliability. Each data packet is coded using certain forward error correction (FEC) scheme. Each subpacket may only contains a portion of the coded bits. If the transmission for subpacket k fails, as indicated by a NAK in a feedback acknowledgement channel, a retransmission subpacket, subpacket k+1, is transmitted to help the receiver decode the packet. The retransmission subpackets may contain different coded bits than the previous subpackets. The receiver may softly combine or jointly decode all the received subpackets to improve the chance of decoding. Normally, a maximum number of transmissions is configured in consideration of both reliability, packet delay, and implementation complexity. FIG. 9 shows an example of general HARQ operation.

In conjunction of rate matching process, HARQ functionality is controlled by the redundancy version (RV) parameters. The exact set of bits at the output of the hybrid ARQ functionality depends on the number of input bits, the number of output bits, RM processing, and the RV parameters.

Figure 10:
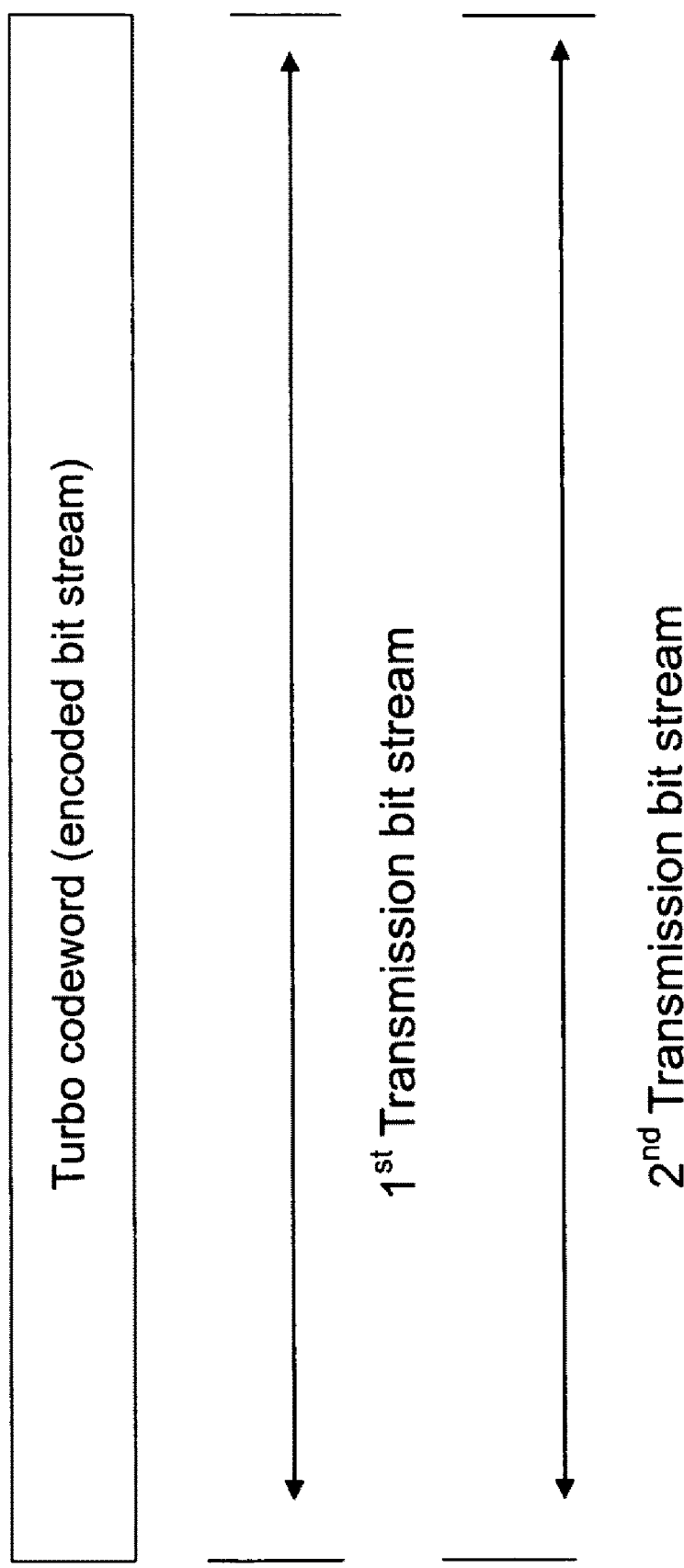
FIG. 10 schematically illustrates a chase combining (CC) based HARQ operation.
Figure 11:
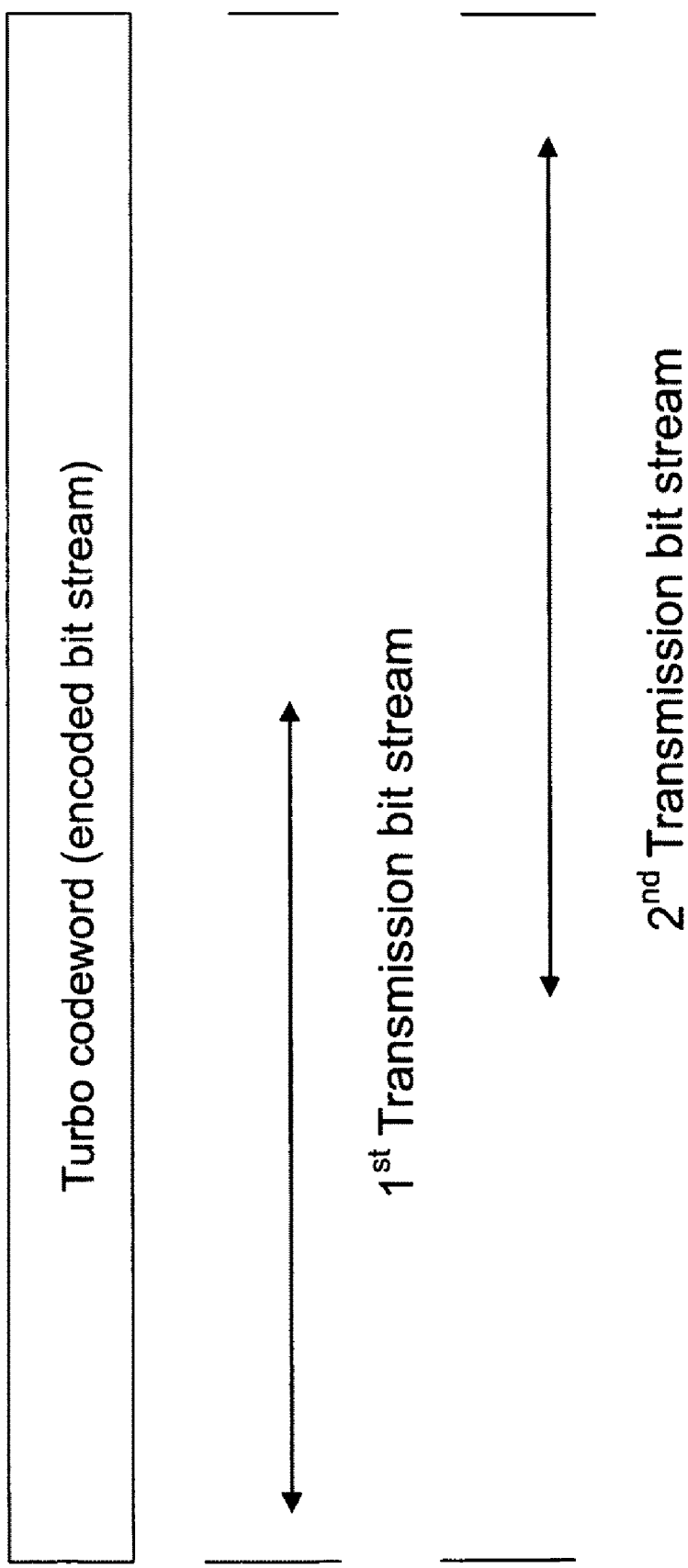
FIG. 11 schematically illustrates a incremental redundancy (IR) based HARQ operation.

It is noted that redundancy version (RV) parameters are used to determine how much information bits are transmitted on each transmission, including the first transmission and other retransmission. In terms of how much redundancy information bits transmitted, two types of HARQ operations can be used: Chase Combing (CC) based HARQ operation and Incremental Redundancy (IR) based HARQ operation. For CC-based HARQ, the full buffer encoded bit stream, as shown in FIG. 10, is fully retransmitted. That is, the transmission bit stream for the $1^{st}$ transmission and the $2^{nd}$ transmission are the same. CC-based HARQ allows the receiver to conduct modulation symbol level combing in addition to bit level combing. For IR-based HARQ, only partial bit stream within a codeword are transmitted in the $1^{st}$ transmission. In the $2^{nd}$ transmission, only bit stream within a codeword are transmitted. This partial bit stream may or may not overlap with $1^{st}$ transmission bit stream, as shown in FIG. 11. Typically, IR-based HARQ provide a better spectral efficiency over CC-based HARQ at the expense of additional receiver implementation complexity.

Typically, CC-based or IR-based HARQ in turbo-coded systems requires that an original transmission bit stream should not be mapped into the same modulation constellation as its retransmission bit stream. This is known as Bit Priority Mapping (BMP). Traditional BPM refers to prioritizing the systematic bits by placing them in the high reliable bit positions of high-order constellation symbol, so the systematic bits can obtain more protection than parity bits. This bit mapping method is based on the principle that systematic bits are more valuable than parity bits. BMP is particularly critical for high order modulation such as 16-Quadrature amplitude modulation (QAM) or 64QAM. This is because the neighbor relationship in the constellation, one modulation symbol can be denoted by 4/6 binary bits and each bit in them has different reliability. For 16QAM, two bits have high reliability and anther two bits have low reliability; for 64QAM, some two bits have high reliability, some other two bits have medium reliability, and the rest two bits have low reliability.

In an IR-based combining with circular buffer rate matching such as E-UTRA HARQ system, BMP issue is directly related to how the starting point of redundancy version of transmission is optimally chosen.

In this invention, our proposals focus on how the starting point of redundancy version of transmission is optimally determined on circular rate-matching/HARQ operation. Our proposal application is for turbo-coded OFDM wireless systems.

As an example, this invention can be used for both downlink and uplink of E-UTRA systems. Below, we briefly describe two transmission formats of downlink and uplink communications in E-UTRA systems.

Figure 12:
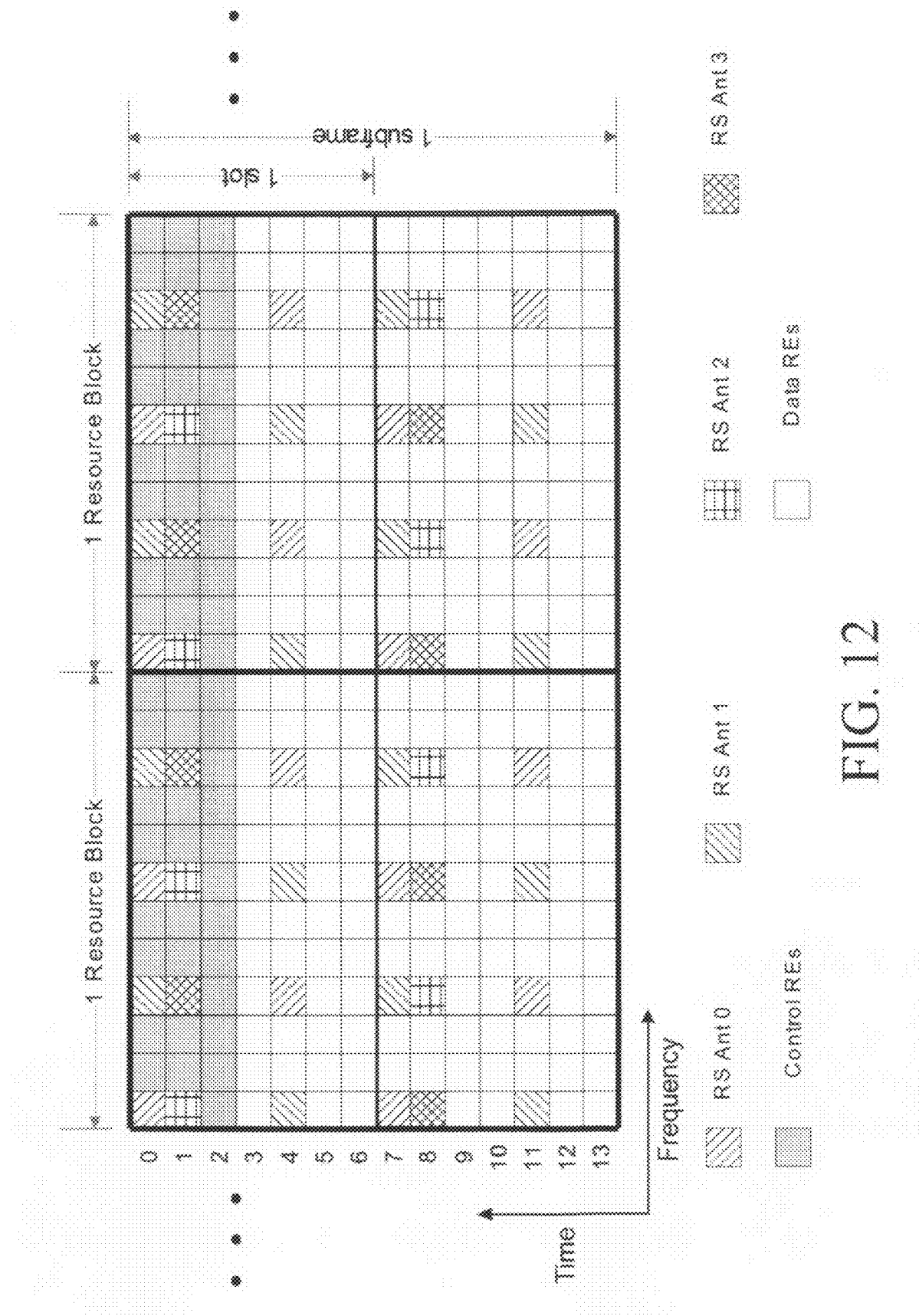
FIG. 12 schematically illustrates a E-UTRA downlink subframe.

The downlink subframe structure of E-UTRA is shown in FIG. 12. In a typical configuration, each subframe is 1 ms long, containing 14 OFDM symbols. Assume the OFDM symbols in a subframe are indexed from 0 to 13. Reference symbols (RS) for antenna 0 and 1 are located in OFDM symbol 0, 4, 7, and 11. If present, reference symbols (RS) for antennas 2 and 3 are located in OFDM symbol 2 and 8. The control channels, including Control Channel Format Indicator (CCFI), acknowledgement channel (ACK), packet data control channel (PDCCH), are transmitted in the first one, or two, or three OFDM symbols. The number of OFDM symbols used for control channel is indicated by CCFI. For example, the control channels can occupy the first OFDM symbol, or the first two OFDM symbols, or the first three OFDM symbols. Data channels, i.e., Physical Downlink Shared Channel (PDSCH), are transmitted in other OFDM symbols.

Figure 13:
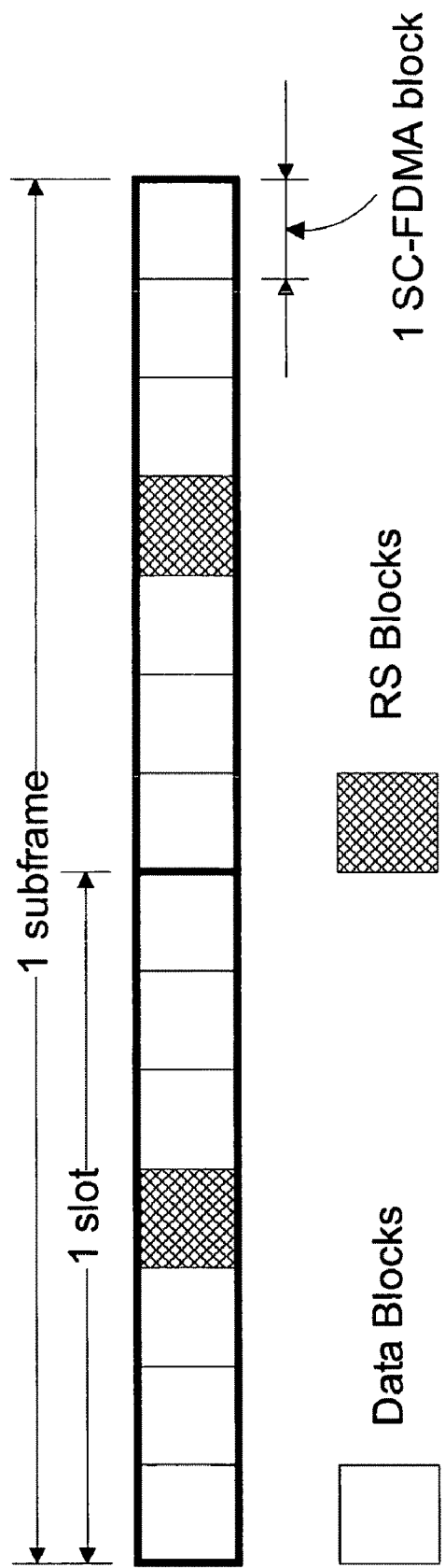
FIG. 13 schematically illustrates a E-UTRA uplink subframe.

The uplink subframe structure (for data transmissions) is shown in FIG. 13. Note the E-UTRA uplink is a SC-FDMA based system, which is very much like an OFDMA system with some differences. Similar to an OFDM symbol, each SC-FDMA block has a cyclic prefix (CP). For data transmissions, the reference signals are located at the 4-th SC-FDMA block and the 11-th SC-FDMA block with the rest of the SC-FDMA blocks carrying data. Note that FIG. 13 only shows the time-domain structure of an uplink subframe. For each individual UE, its transmission may only occupy a portion of the whole bandwidth in frequency domain. And different users and control signals are multiplexed in the frequency domain via SC-FDMA.

In this invention, we propose methods and apparatus of redundancy version of retransmission for turbo-coded OFDM wireless systems to improve the reliability of the transmission and reduce the transmitter and receiver complexity.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings. In the following illustrations, we use data channel in E-UTRA systems as an example. However, the technique illustrated here can certainly be used in other channel in E-UTRA systems, and other data, control, or other channels in other systems whenever applicable.

Figure 14:
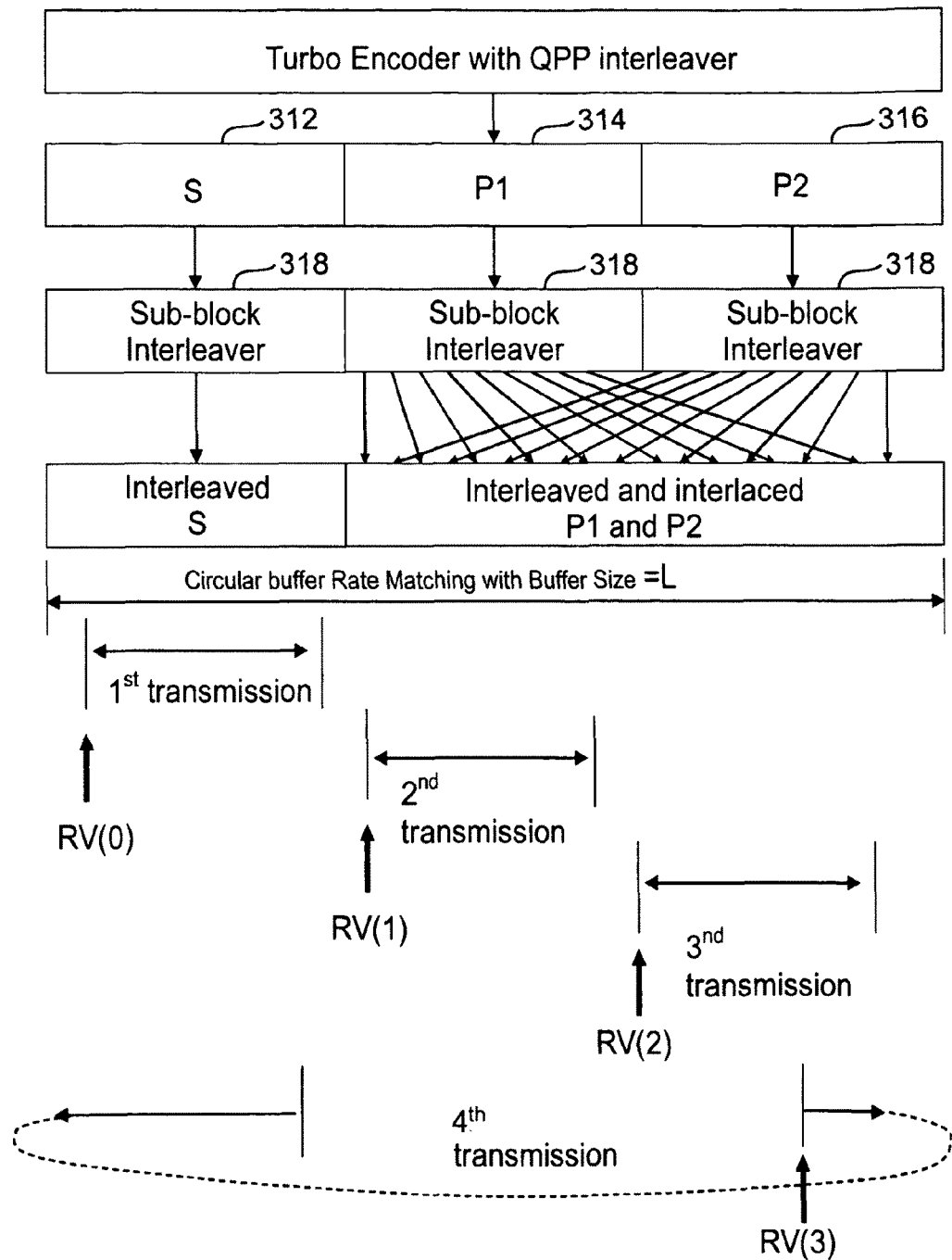
FIG. 14 schematically illustrates redundancy version (RV) transmissions as an embodiment according to the principles of the present invention.

As shown in FIG. 14, there are three bit streams for each code block at the turbo encoder output, namely, the systematic bit stream S 312, the first parity stream P1 314, and the second parity stream P2 316. The circular buffer rate matching consists of the following steps:
1. Each of the three streams is interleaved separately by a sub-block interleaver 318;
2. The interleaved systematic bits S 312 are written into a buffer in sequence, with the first bit of the interleaved systematic bit stream S at the beginning of the buffer. The interleaved P1 and P2 streams are interlaced bit by bit; and
3. The interleaved and interlaced parity bit streams P1 314 and P2 316 are written into the buffer in sequence, with the first bit of the stream next to the last bit of the interleaved systematic bit stream.

Four redundancy versions (RV) are defined, each of which specifies a starting bit index in the buffer. The transmitter chooses one RV for each HARQ transmission. The transmitter reads a block of coded bits from the buffer, starting from the bit index specified by a chosen RV.

The sub-block interleaver is a row-column interleaver with the number of columns C=32. Define D as the code block size, including information bits and tail bits. In other words, D=K+4 where K is the number of information bits in each code block, or the QPP interleaver size. The number of rows of the sub-block interleaver is specified as R=⌈K/32⌉. The operation of the interleaver can be described as follows:
1. Starting from the 0-th row and the 0-th column, write in row by row, i.e., increase column index first;
2. Fill up the R×C rectangle with dummy bits, if needed. The number of dummy bits Y=R×C−D;
3. Permute the column with the following pattern: 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31;
4. Starting from the 0-th row and the 0-th column, read out column by column, i.e., increase row index first; and
5. The size of circular buffer is L=3*(K+4). Note that the dummy bits are removed from circular buffer before transmission.

It is noted that the number of dummy bits, Y, can be 4, 12, 20, and 28, depending on the information size (or QPP interleaver size) K. Four redundancy versions are defined in the circular buffer, with the index of the first bit in the circular buffer being 0. It is noted that in an IR-based HARQ operation with circular buffer rate matching like E-UTRA system, it is critically important to choose the starting position of each redundancy version transmission to ensure that all codeword bits achieving approximately equal protection through proper modulation constellation rearrangement. Note that dummy bits are filled before the interleaving process, and are removed before filling the coded bits into the circular buffer.

Before we further address the detail of embodiment, we define $\Delta(j,p)$ as the number of bits between the starting point of redundancy transmission p, RV(p) and redundancy transmission j, RV(j).

In a first embodiment according to the principles of the present invention, we propose a method of choosing the starting position of at least one redundancy version in the circular buffer such that the number of coded bits between the starting position of a first redundancy version transmission and the starting position of a second redundancy version transmission is not divisible by the modulation order of a modulation scheme used for modulating data to be transmitted. Note that the first redundancy version and the second redundancy version are not limited to be immediately adjacent to each other. For example, the modulation order of 16-QAM is 4, and the modulation order of 64-QAM is 6. For example, one implementation of this embodiment is to apply an offset to the starting position of a redundancy version transmission defined by $R \times ((24 \times j)+2)$. We can choose the starting position of a j-th redundancy version transmission as:

$$RV(j)=R\times((24\times j)+2)+\delta^{RV}(j), \text{ for } j=0,1,\ldots,3. \quad (10)$$

For example, since 16-QAM and 64-QAM are the most frequently used higher-order-modulation schemes, we can choose $\delta^{RV}(j)$ such that $\Delta'(j,p)=[R\times((24\times j)+2)]-[R\times((24\times p)+2)]$ is not divisible by 4 and 6 for any, or most of, two redundancy versions j and p. Note that this embodiment is applicable at both the transmitter and receiver.

In a second embodiment according to the principles of the present invention, we propose another method of choosing the starting position of at least one redundancy version in the circular buffer based on redundancy transmission index j, or information size (or QPP interleaver size) K, or modulation order, or a combination of these parameters. For example, we can choose the starting position of a j-th redundancy version transmission as $RV(j)=R\times((24\times j)+2)+\delta^{RV}(j)$ for $j=0, 1, \ldots, 3$. $\delta^{RV}(j)$ is based on the following algorithm to ensure that $\Delta'(j,p)=[R\times((24\times j)+2)]-[R\times((24\times p)+2)]$ is not divisible by 4 and 6 for any, or most of, two redundancy versions j and p, such that the performance of transmissions with higher order modulation such as QAM 16 and QAM64 is improved. For a given modulation type and a given QPP interleaver size, K, we conduct the following algorithm to find $\delta^{RV}(j)$.

When QPSK modulation is used for transmission, we set $\delta^{RV}(j)=0$. Note that M=2 for QPSK modulation.

When QAM16 modulation is used for transmission, we set $\delta^{RV}(j)$ as follows:

if $\Delta'(j,p)/4$ is an integer number $\delta^{RV}(j)=1,2$ or 3, else $\delta^{RV}(j)=0$.

Note that M=4 for QAM-16 modulation, and $\Delta'(j,p)$ is defined as above.

When QAM64 modulation is used for transmission, we set $\delta^{RV}(j)$ as follows:

if $\Delta'(j,p)/6$ is an integer number $\delta^{RV}(j)=1,2,3,4$ or 5, else $\delta^{RV}(j)=0$.

Note that M=4 for QAM-64 modulation, and $\Delta'(j,p)$ is defined as above.

In a third embodiment according to the principles of the present invention, we propose another method of choosing the starting position of at least one redundancy version in the circular buffer by setting the starting position of a j-th redundancy version transmission as:

$$RV(j)=R\times((G\times j)+2), \text{ for } j=0,1,\ldots,3, \quad (11)$$

where G is not divisible by at least one modulation order, e.g., 4 or 6. Since RV(j) is function of QPP interleaver size, which is divisible by 4, as shown in Table 1, by choosing G properly to be not divisible by 4, this would increase the occurrence that $\Delta(j,p)$ is not divisible by 4 and 6, for any, or most of, two redundancy versions j and p. For example, we can choose G to be 27, or 29, or 23. Then, the corresponding redundancy versions could be respectively given as:

$$RV(j)=R\times((27\times j)+2), \text{ for } j=0, 1, \ldots, 3, \quad (12)$$

$$RV(j)=R\times((29\times j)+2), \text{ for } j=0, 1, \ldots, 3, \quad (13)$$

$$RV(j)=R\times((23\times j)+2), \text{ for } j=0, 1, \ldots, 3, \quad (14)$$

In a fourth embodiment according to the principles of the present invention, we propose to change the circular buffer size L to a number that is not divisible by at least one modulation order, e.g., 4 or 6. For example, we can choose the staring position of a j-th redundancy version transmission as:

$$RV(j)=R\times((24\times j)+2), \text{ for } j=0, 1, \ldots, 3, \quad (15)$$

and change the buffer size L to L−1 if L−1 is not divisible by 4 and 6. With the buffer size changed, this would increase the occurrence that $\Delta(j,p)$ is not divisible by 4 and 6, for any, or most of, two redundancy versions j and p.

In a fifth embodiment according to the principles of the present invention, we propose to choose the starting position of a j-th redundancy version transmission as $RV(j)=R\times((24\times j)+2)+\delta^{RV}(j)$, for $j=0, 1, \ldots, 3$. $\delta^{RV}(j)$ is determined by the modulation order M, the QPP interleaver size K, and redundancy version j. As shown above, the number of dummy bits, Y, can be 4, 12, 20, and 28, for a given QPP interleaver size K. We denote Y1=4, Y2=12, Y3=20, and Y4=28. For example, for high order modulation transmission such as QAM16, $\delta^{RV}(j)$ may be generated based on the following table.

TABLE 2

| | Offset for RV definition $\delta^{RV}(j)$ | | | |
|---|---|---|---|---|
| | RV(0), j = 0 | RV(1), j = 1 | RV(2), j = 2 | RV(3), j = 3 |
| Y1 | 0 | 0 | 0 | 1 |
| Y2 | 0 | 0 | 0 | 1 |
| Y3 | 0 | 0 | 0 | 3 |
| Y4 | 0 | 0 | 1 | 0 |

In a sixth embodiment according to the principles of the present invention, we propose to choose the starting position of a j-th redundancy version transmission as $RV(j)=R\times((24\times j)+2)+\delta^{RV}(j)$, for $j=0, 1, \ldots, 3$. $\delta^{RV}(j)$ is determined by the modulation order M, the QPP interleaver size K, and redundancy version j. For example, for high order modulation transmission such as QAM16 and QAM 64, $\delta^{RV}(j)$ is generated based on Table 3. Note that there are totally 188 QPP interleaver size, i is the QPP interleaver size index=1, 2, 3, ... 187, 188, and i is determined in dependence upon the QPP interleaver size K based on Table 1. Also note that $\delta^{RV}(j)=0$ for j=0.

TABLE 3

| | Offset for RV definition $\delta^{RV}(j)$ | | |
|---|---|---|---|
| i | j = 1 | j = 2 | j = 3 |
| 1 | 0 | 1 | 0 |
| 2 | 0 | 0 | 3 |
| 3 | 0 | 5 | 4 |
| 4 | 3 | 1 | 4 |
| 5 | 0 | 1 | 0 |
| 6 | 0 | 0 | 3 |
| 7 | 0 | 5 | 4 |
| 8 | 3 | 1 | 4 |
| 9 | 0 | 1 | 0 |
| 10 | 0 | 0 | 3 |
| 11 | 0 | 5 | 4 |
| 12 | 3 | 1 | 4 |
| 13 | 0 | 1 | 0 |
| 14 | 0 | 0 | 3 |
| 15 | 0 | 5 | 4 |
| 16 | 3 | 1 | 4 |
| 17 | 0 | 1 | 0 |
| 18 | 0 | 0 | 3 |
| 19 | 0 | 5 | 4 |
| 20 | 3 | 1 | 4 |
| 21 | 0 | 1 | 0 |
| 22 | 0 | 0 | 3 |
| 23 | 0 | 5 | 4 |
| 24 | 3 | 1 | 4 |

TABLE 3-continued

Offset for RV definition $\delta^{RV}(j)$

| i | j = 1 | j = 2 | j = 3 |
|---|---|---|---|
| 25 | 0 | 1 | 0 |
| 26 | 0 | 0 | 3 |
| 27 | 0 | 5 | 4 |
| 28 | 3 | 1 | 4 |
| 29 | 0 | 1 | 0 |
| 30 | 0 | 0 | 3 |
| 31 | 0 | 5 | 4 |
| 32 | 3 | 1 | 4 |
| 33 | 0 | 1 | 0 |
| 34 | 0 | 0 | 3 |
| 35 | 0 | 5 | 4 |
| 36 | 3 | 1 | 4 |
| 37 | 0 | 1 | 0 |
| 38 | 0 | 0 | 3 |
| 39 | 0 | 5 | 4 |
| 40 | 3 | 1 | 4 |
| 41 | 0 | 1 | 0 |
| 42 | 0 | 0 | 3 |
| 43 | 0 | 5 | 4 |
| 44 | 3 | 1 | 4 |
| 45 | 0 | 1 | 0 |
| 46 | 0 | 0 | 3 |
| 47 | 0 | 5 | 4 |
| 48 | 3 | 1 | 4 |
| 49 | 0 | 1 | 0 |
| 50 | 0 | 0 | 3 |
| 51 | 0 | 5 | 4 |
| 52 | 3 | 1 | 4 |
| 53 | 0 | 1 | 0 |
| 54 | 0 | 0 | 3 |
| 55 | 0 | 5 | 4 |
| 56 | 3 | 1 | 4 |
| 57 | 0 | 1 | 0 |
| 58 | 0 | 0 | 3 |
| 59 | 0 | 5 | 4 |
| 60 | 3 | 1 | 4 |
| 61 | 0 | 0 | 3 |
| 62 | 3 | 1 | 4 |
| 63 | 0 | 0 | 3 |
| 64 | 3 | 1 | 4 |
| 65 | 0 | 0 | 3 |
| 66 | 3 | 1 | 4 |
| 67 | 0 | 0 | 3 |
| 68 | 3 | 1 | 4 |
| 69 | 0 | 0 | 3 |
| 70 | 3 | 1 | 4 |
| 71 | 0 | 0 | 3 |
| 72 | 3 | 1 | 4 |
| 73 | 0 | 0 | 3 |
| 74 | 3 | 1 | 4 |
| 75 | 0 | 0 | 3 |
| 76 | 3 | 1 | 4 |
| 77 | 0 | 0 | 3 |
| 78 | 3 | 1 | 4 |
| 79 | 0 | 0 | 3 |
| 80 | 3 | 1 | 4 |
| 81 | 0 | 0 | 3 |
| 82 | 3 | 1 | 4 |
| 83 | 0 | 0 | 3 |
| 84 | 3 | 1 | 4 |
| 85 | 0 | 0 | 3 |
| 86 | 3 | 1 | 4 |
| 87 | 0 | 0 | 3 |
| 88 | 3 | 1 | 4 |
| 89 | 0 | 0 | 3 |
| 90 | 3 | 1 | 4 |
| 91 | 0 | 0 | 3 |
| 92 | 3 | 1 | 4 |
| 93 | 3 | 1 | 4 |
| 94 | 3 | 1 | 4 |
| 95 | 3 | 1 | 4 |
| 96 | 3 | 1 | 4 |
| 97 | 3 | 1 | 4 |
| 98 | 3 | 1 | 4 |
| 99 | 3 | 1 | 4 |
| 100 | 3 | 1 | 4 |
| 101 | 3 | 1 | 4 |
| 102 | 3 | 1 | 4 |
| 103 | 3 | 1 | 4 |
| 104 | 3 | 1 | 4 |
| 105 | 3 | 1 | 4 |
| 106 | 3 | 1 | 4 |
| 107 | 3 | 1 | 4 |
| 108 | 3 | 1 | 4 |
| 109 | 3 | 1 | 4 |
| 110 | 3 | 1 | 4 |
| 111 | 3 | 1 | 4 |
| 112 | 3 | 1 | 4 |
| 113 | 3 | 1 | 4 |
| 114 | 3 | 1 | 4 |
| 115 | 3 | 1 | 4 |
| 116 | 3 | 1 | 4 |
| 117 | 3 | 1 | 4 |
| 118 | 3 | 1 | 4 |
| 119 | 3 | 1 | 4 |
| 120 | 3 | 1 | 4 |
| 121 | 3 | 1 | 4 |
| 122 | 3 | 1 | 4 |
| 123 | 3 | 1 | 4 |
| 124 | 3 | 1 | 4 |
| 125 | 3 | 1 | 4 |
| 126 | 3 | 1 | 4 |
| 127 | 3 | 1 | 4 |
| 128 | 3 | 1 | 4 |
| 129 | 3 | 1 | 4 |
| 130 | 3 | 1 | 4 |
| 131 | 3 | 1 | 4 |
| 132 | 3 | 1 | 4 |
| 133 | 3 | 1 | 4 |
| 134 | 3 | 1 | 4 |
| 135 | 3 | 1 | 4 |
| 136 | 3 | 1 | 4 |
| 137 | 3 | 1 | 4 |
| 138 | 3 | 1 | 4 |
| 139 | 3 | 1 | 4 |
| 140 | 3 | 1 | 4 |
| 141 | 3 | 1 | 4 |
| 142 | 3 | 1 | 4 |
| 143 | 3 | 1 | 4 |
| 144 | 3 | 1 | 4 |
| 145 | 3 | 1 | 4 |
| 146 | 3 | 1 | 4 |
| 147 | 3 | 1 | 4 |
| 148 | 3 | 1 | 4 |
| 149 | 3 | 1 | 4 |
| 150 | 3 | 1 | 4 |
| 151 | 3 | 1 | 4 |
| 152 | 3 | 1 | 4 |
| 153 | 3 | 1 | 4 |
| 154 | 3 | 1 | 4 |
| 155 | 3 | 1 | 4 |
| 156 | 3 | 1 | 4 |
| 157 | 3 | 1 | 4 |
| 158 | 3 | 1 | 4 |
| 159 | 3 | 1 | 4 |
| 160 | 3 | 1 | 4 |
| 161 | 3 | 1 | 4 |
| 162 | 3 | 1 | 4 |
| 163 | 3 | 1 | 4 |
| 164 | 3 | 1 | 4 |
| 165 | 3 | 1 | 4 |
| 166 | 3 | 1 | 4 |
| 167 | 3 | 1 | 4 |
| 168 | 3 | 1 | 4 |
| 169 | 3 | 1 | 4 |
| 170 | 3 | 1 | 4 |
| 171 | 3 | 1 | 4 |
| 172 | 3 | 1 | 4 |
| 173 | 3 | 1 | 4 |
| 174 | 3 | 1 | 4 |
| 175 | 3 | 1 | 4 |
| 176 | 3 | 1 | 4 |

TABLE 3-continued

Offset for RV definition $\delta^{RV}(j)$

| i | j = 1 | j = 2 | j = 3 |
|---|---|---|---|
| 177 | 3 | 1 | 4 |
| 178 | 3 | 1 | 4 |
| 179 | 3 | 1 | 4 |
| 180 | 3 | 1 | 4 |
| 181 | 3 | 1 | 4 |
| 182 | 3 | 1 | 4 |
| 183 | 3 | 1 | 4 |
| 184 | 3 | 1 | 4 |
| 185 | 3 | 1 | 4 |
| 186 | 3 | 1 | 4 |
| 187 | 3 | 1 | 4 |
| 188 | 3 | 1 | 4 |

In a seventh embodiment according to the principles of the present invention, we propose to choose the starting position of a j-th redundancy version transmission as $RV(j) = R \times ((28 \times j) + 2) + \delta^{RV}(j)$, for $j = 0, 1, \ldots, 3$. $\delta^{RV}(j)$ is determined by the modulation order M, the QPP interleaver size K, redundancy version j. For example, for high order modulation transmission such as QAM16 and QAM 64, $\delta^{RV}(j)$ is generated based on the Table 4. Note that there are totally 188 QPP interleaver size, i is the QPP interleaver size index = 1, 2, 3, ... 187, 188, and i is determined in dependence upon the QPP interleaver size K based on Table 1. Also note that $\delta^{RV}(j) = 0$ for $j = 0$.

TABLE 4

Offset for RV definition $\delta^{RV}(j)$

| i | j = 1 | j = 2 | j = 3 |
|---|---|---|---|
| 1 | 0 | 1 | 3 |
| 2 | 0 | 5 | 3 |
| 3 | 0 | 1 | 1 |
| 4 | 0 | 0 | 4 |
| 5 | 0 | 2 | 2 |
| 6 | 1 | 2 | 1 |
| 7 | 0 | 2 | 0 |
| 8 | 3 | 1 | 0 |
| 9 | 0 | 1 | 3 |
| 10 | 0 | 1 | 3 |
| 11 | 0 | 1 | 1 |
| 12 | 0 | 5 | 0 |
| 13 | 0 | 1 | 3 |
| 14 | 0 | 5 | 3 |
| 15 | 0 | 1 | 1 |
| 16 | 0 | 0 | 4 |
| 17 | 0 | 2 | 2 |
| 18 | 1 | 2 | 1 |
| 19 | 0 | 2 | 0 |
| 20 | 3 | 1 | 0 |
| 21 | 0 | 1 | 3 |
| 22 | 0 | 1 | 3 |
| 23 | 0 | 1 | 1 |
| 24 | 0 | 5 | 0 |
| 25 | 0 | 1 | 3 |
| 26 | 0 | 5 | 3 |
| 27 | 0 | 1 | 1 |
| 28 | 0 | 0 | 4 |
| 29 | 0 | 2 | 2 |
| 30 | 1 | 2 | 1 |
| 31 | 0 | 2 | 0 |
| 32 | 3 | 1 | 0 |
| 33 | 0 | 1 | 3 |
| 34 | 0 | 1 | 3 |
| 35 | 0 | 1 | 1 |
| 36 | 0 | 5 | 0 |
| 37 | 0 | 1 | 3 |
| 38 | 0 | 5 | 3 |
| 39 | 0 | 1 | 1 |
| 40 | 0 | 0 | 4 |
| 41 | 0 | 2 | 2 |

TABLE 4-continued

Offset for RV definition $\delta^{RV}(j)$

| i | j = 1 | j = 2 | j = 3 |
|---|---|---|---|
| 42 | 1 | 2 | 1 |
| 43 | 0 | 2 | 0 |
| 44 | 3 | 1 | 0 |
| 45 | 0 | 1 | 3 |
| 46 | 0 | 1 | 3 |
| 47 | 0 | 1 | 1 |
| 48 | 0 | 5 | 0 |
| 49 | 0 | 1 | 3 |
| 50 | 0 | 5 | 3 |
| 51 | 0 | 1 | 1 |
| 52 | 0 | 0 | 4 |
| 53 | 0 | 2 | 2 |
| 54 | 1 | 2 | 1 |
| 55 | 0 | 2 | 0 |
| 56 | 3 | 1 | 0 |
| 57 | 0 | 1 | 3 |
| 58 | 0 | 1 | 3 |
| 59 | 0 | 1 | 1 |
| 60 | 0 | 5 | 0 |
| 61 | 0 | 5 | 3 |
| 62 | 0 | 0 | 4 |
| 63 | 1 | 2 | 1 |
| 64 | 3 | 1 | 0 |
| 65 | 0 | 1 | 3 |
| 66 | 0 | 5 | 0 |
| 67 | 0 | 5 | 3 |
| 68 | 0 | 0 | 4 |
| 69 | 1 | 2 | 1 |
| 70 | 3 | 1 | 0 |
| 71 | 0 | 1 | 3 |
| 72 | 0 | 5 | 0 |
| 73 | 0 | 5 | 3 |
| 74 | 0 | 0 | 4 |
| 75 | 1 | 2 | 1 |
| 76 | 3 | 1 | 0 |
| 77 | 0 | 1 | 3 |
| 78 | 0 | 5 | 0 |
| 79 | 0 | 5 | 3 |
| 80 | 0 | 0 | 4 |
| 81 | 1 | 2 | 1 |
| 82 | 3 | 1 | 0 |
| 83 | 0 | 1 | 3 |
| 84 | 0 | 5 | 0 |
| 85 | 0 | 5 | 3 |
| 86 | 0 | 0 | 4 |
| 87 | 1 | 2 | 1 |
| 88 | 3 | 1 | 0 |
| 89 | 0 | 1 | 3 |
| 90 | 0 | 5 | 0 |
| 91 | 0 | 5 | 3 |
| 92 | 0 | 0 | 4 |
| 93 | 3 | 1 | 0 |
| 94 | 0 | 5 | 0 |
| 95 | 0 | 0 | 4 |
| 96 | 3 | 1 | 0 |
| 97 | 0 | 5 | 0 |
| 98 | 0 | 0 | 4 |
| 99 | 3 | 1 | 0 |
| 100 | 0 | 5 | 0 |
| 101 | 0 | 0 | 4 |
| 102 | 3 | 1 | 0 |
| 103 | 0 | 5 | 0 |
| 104 | 0 | 0 | 4 |
| 105 | 3 | 1 | 0 |
| 106 | 0 | 5 | 0 |
| 107 | 0 | 0 | 4 |
| 108 | 3 | 1 | 0 |
| 109 | 0 | 5 | 0 |
| 110 | 0 | 0 | 4 |
| 111 | 3 | 1 | 0 |
| 112 | 0 | 5 | 0 |
| 113 | 0 | 0 | 4 |
| 114 | 3 | 1 | 0 |
| 115 | 0 | 5 | 0 |
| 116 | 0 | 0 | 4 |
| 117 | 3 | 1 | 0 |

TABLE 4-continued

Offset for RV definition $\delta^{RV}(j)$

| i | j = 1 | j = 2 | j = 3 |
|---|---|---|---|
| 118 | 0 | 5 | 0 |
| 119 | 0 | 0 | 4 |
| 120 | 3 | 1 | 0 |
| 121 | 0 | 5 | 0 |
| 122 | 0 | 0 | 4 |
| 123 | 3 | 1 | 0 |
| 124 | 0 | 5 | 0 |
| 125 | 3 | 1 | 0 |
| 126 | 0 | 0 | 4 |
| 127 | 0 | 5 | 0 |
| 128 | 3 | 1 | 0 |
| 129 | 0 | 0 | 4 |
| 130 | 0 | 5 | 0 |
| 131 | 3 | 1 | 0 |
| 132 | 0 | 0 | 4 |
| 133 | 0 | 5 | 0 |
| 134 | 3 | 1 | 0 |
| 135 | 0 | 0 | 4 |
| 136 | 0 | 5 | 0 |
| 137 | 3 | 1 | 0 |
| 138 | 0 | 0 | 4 |
| 139 | 0 | 5 | 0 |
| 140 | 3 | 1 | 0 |
| 141 | 0 | 0 | 4 |
| 142 | 0 | 5 | 0 |
| 143 | 3 | 1 | 0 |
| 144 | 0 | 0 | 4 |
| 145 | 0 | 5 | 0 |
| 146 | 3 | 1 | 0 |
| 147 | 0 | 0 | 4 |
| 148 | 0 | 5 | 0 |
| 149 | 3 | 1 | 0 |
| 150 | 0 | 0 | 4 |
| 151 | 0 | 5 | 0 |
| 152 | 3 | 1 | 0 |
| 153 | 0 | 0 | 4 |
| 154 | 0 | 5 | 0 |
| 155 | 3 | 1 | 0 |
| 156 | 0 | 0 | 4 |
| 157 | 0 | 5 | 0 |
| 158 | 3 | 1 | 0 |
| 159 | 0 | 0 | 4 |
| 160 | 0 | 5 | 0 |
| 161 | 3 | 1 | 0 |
| 162 | 0 | 0 | 4 |
| 163 | 0 | 5 | 0 |
| 164 | 3 | 1 | 0 |
| 165 | 0 | 0 | 4 |
| 166 | 0 | 5 | 0 |
| 167 | 3 | 1 | 0 |
| 168 | 0 | 0 | 4 |
| 169 | 0 | 5 | 0 |
| 170 | 3 | 1 | 0 |
| 171 | 0 | 0 | 4 |
| 172 | 0 | 5 | 0 |
| 173 | 3 | 1 | 0 |
| 174 | 0 | 0 | 4 |
| 175 | 0 | 5 | 0 |
| 176 | 3 | 1 | 0 |
| 177 | 0 | 0 | 4 |
| 178 | 0 | 5 | 0 |
| 179 | 3 | 1 | 0 |
| 180 | 0 | 0 | 4 |
| 181 | 0 | 5 | 0 |
| 182 | 3 | 1 | 0 |
| 183 | 0 | 0 | 4 |
| 184 | 0 | 5 | 0 |
| 185 | 3 | 1 | 0 |
| 186 | 0 | 0 | 4 |
| 187 | 0 | 5 | 0 |
| 188 | 3 | 1 | 0 |

Note that although the description of the embodiments is based on the concept of circular buffer, the actual implementation of transmitter or receiver may not implement the circular buffer as a single and separate step. Instead, the circular buffer rate matching operation may be jointed achieved with other processes such as rate matching due to buffer size limitation, sub-block interleaving, bit selection for a given redundancy version, filler bits padding/depadding, dummy bits insertion/pruning, modulation, channel interleaving, and mapping modulation symbols to physical resources, etc.

Figure 15:
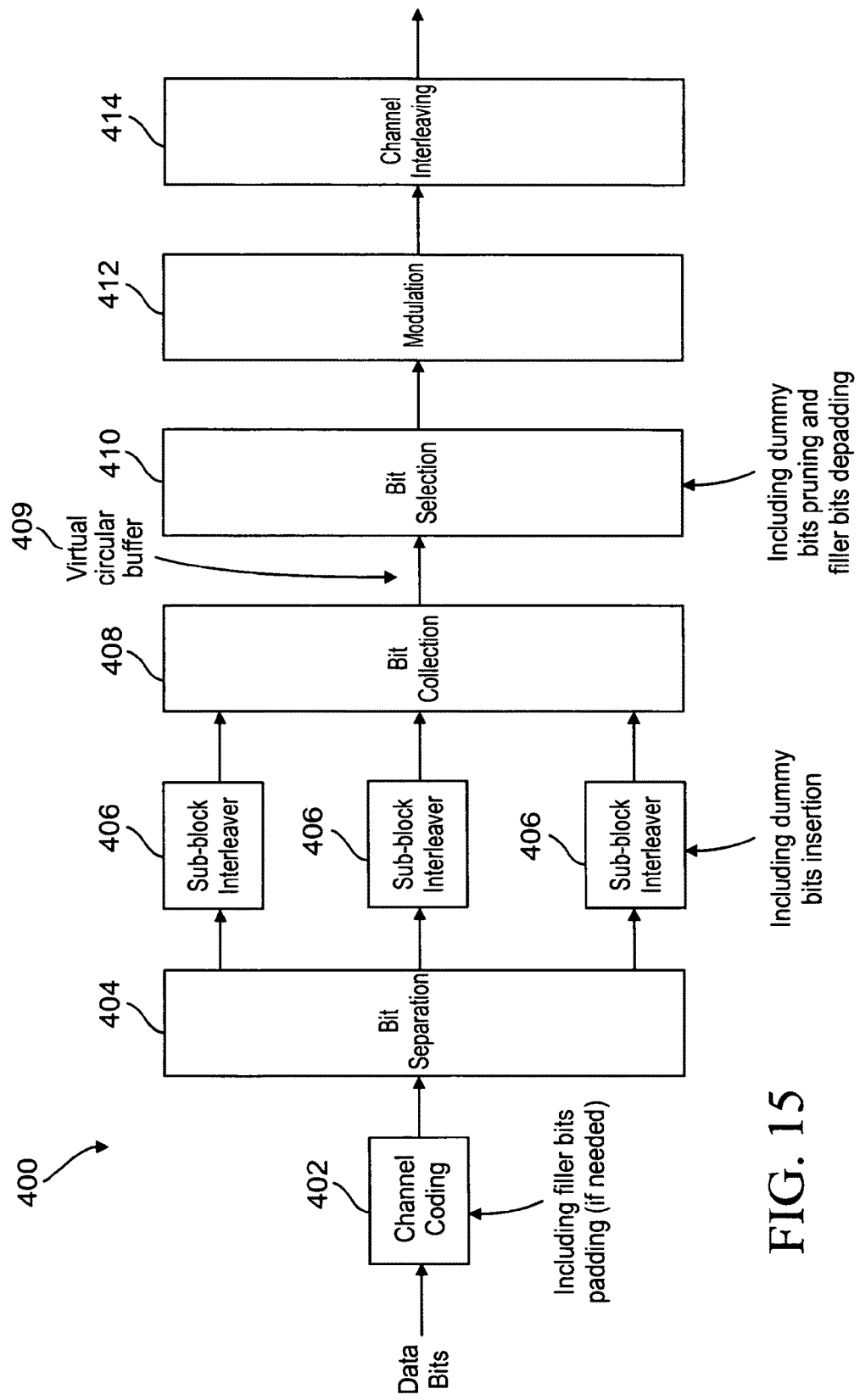
FIG. 15 schematically illustrates an example of a data channel transmitter chain including rate matching.

FIG. 15 illustrates part of a transmitter chain 400 for LTE downlink shared channel (DL_SCH) and uplink shared channel (UL_SCH). As shown in FIG. 15, information bits are first encoded by a channel coding unit 402, e.g., a turbo encoder. The encoded bits are separated into multiple sub-blocks by a bit separation unit 404. Each sub-block is interleaved by a respective corresponding sub-block interleaving unit 406. The interleaved bits are collected by a bit collection unit 408. Then, for each transmission, a subset of bits are selected by a bit selection unit 410 and modulated by a modulation unit 412. The channel is interleaved by a channel interleaving unit 414 before the signal is finally transmitted. The embodiments described in this invention, i.e., the virtual circular buffer 409, can be applied to the 'Bit Selection' step in the process that uses the value of redundancy version and/or new data indication to select the coded bits for each transmission. Clearly, it is recognized by one of ordinary skill in the art that the embodiments of the inventions have applicability to the implementations if the 'Bit Selection' step is combined with other steps in the transmitter processing chain.

Figure 16:
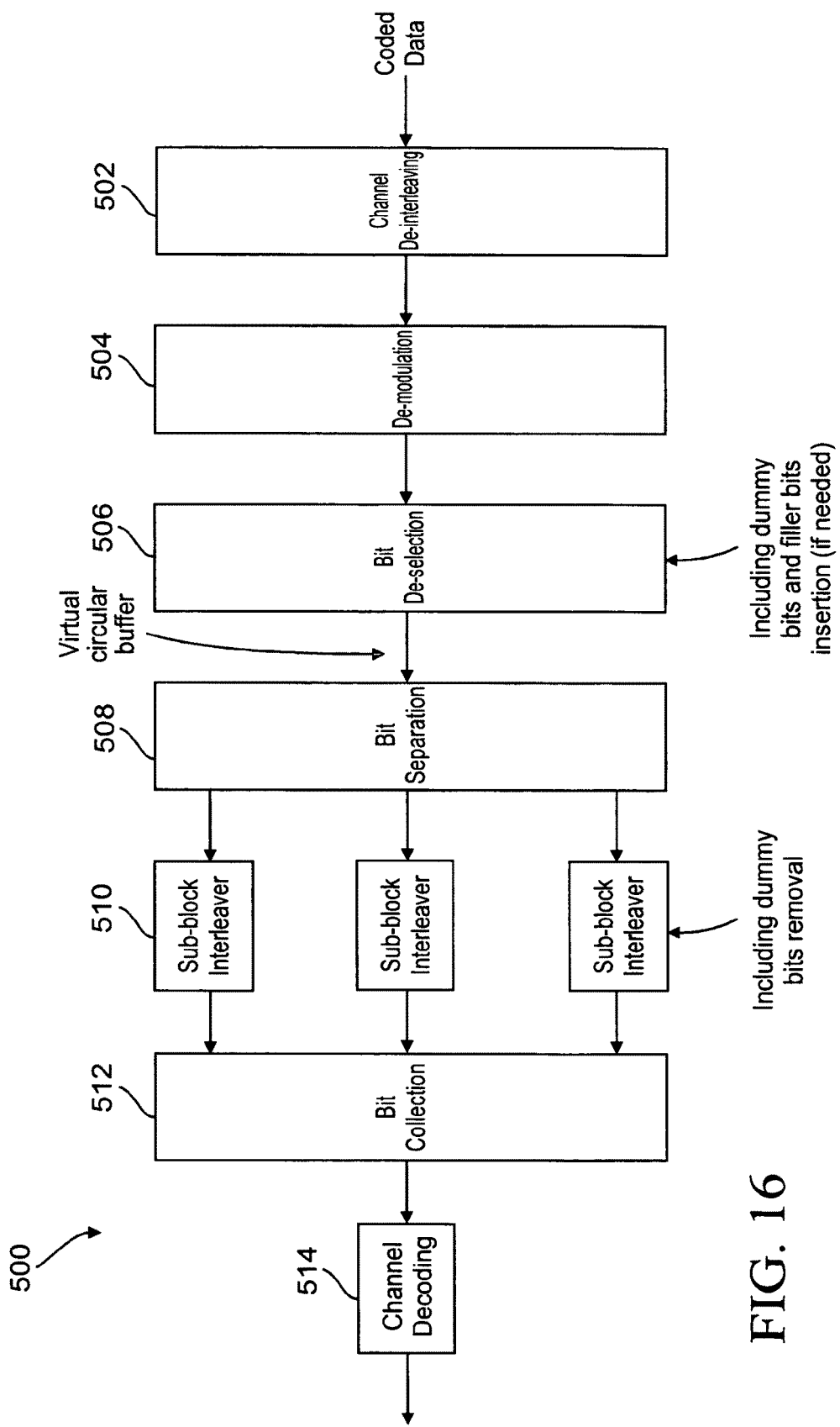
FIG. 16 schematically illustrates an example of a data channel receiver chain including de-rate-matching.

Similarly, FIG. 16 illustrates part of a receiver chain 500 for LTE DL_SCH and UL_SCH. As shown in FIG. 16, when data signals are received at a receiver, the channel is first de-interleaved by channel de-interleaving unit 502. Then, the data signals are de-modulated by a de-modulation unit 504 to generate a plurality of sets of de-modulated bits. The de-modulated bits are stored into a storing unit, e.g., a virtual circular buffer, by a bit de-selection unit 506. Then, the stored bits are separated into multiple sub-blocks by a bit separation unit 508. Each sub-block is interleaved by a respective corresponding sub-block interleaving unit 510. The interleaved bits of the multiple sub-blocks are collected by a bit collection unit 512. Finally, the channel is decoded by a channel decoding unit 514 to restore the original signal. The embodiments described in this invention can be applied to the 'Bit De-selection' step in the process that uses the value of redundancy version and/or new data indication to put the received soft values to the correct positions in the buffer or input to the channel decoder for each transmission. Clearly, it is recognized by one of ordinary skill in the art that the embodiments of the invention have applicability to the implementations if the 'Bit De-selection' step is combined with other steps in the transmitter processing chain.

While the present invention has been shown and described in connection with the preferred embodiments, it will be apparent to those skilled in the art that modifications and variations can be made without departing from the spirit and scope of the invention as defined by the appended claims.

What is claimed is:

1. A method for transmitting data, the method comprising the steps of:
   encoding at least one block of information bits to be transmitted to generate a plurality of coded bits;
   segmenting the plurality of coded bits into a plurality of sub-blocks of coded bits;
   interleaving each of the sub-blocks of coded bits by using a certain interleaver;
   collecting the interleaved coded bits from the plurality of sub-blocks and writing the collected bits into a circular buffer;

determining a plurality of redundancy versions in the circular buffer, with each redundancy version corresponding to a starting bit index in the circular buffer;

selecting a subset of bits in the circular buffer by selecting a redundancy version from among the plurality of redundancy version;

modulating the subset of bits by using a certain modulation scheme; and transmitting the modulated bits via at least one antenna, with, in at least one pair of redundancy versions, the number of bits between the starting point of a first redundancy version and the starting point of a second redundancy version being not divisible by the modulation order of the certain modulation scheme.

2. The method of claim 1, comprised of:

determining four redundancy versions in the circular buffer; and modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j)=R\times((24\times j)+2)+\delta^{RV}(j),$$

where j is the index of the redundancy version, $R\lceil K/32\rceil$, K is the size of the certain interleaver, $\delta^{RV}(j)$ is determined such that $\Delta'(j,p)=[R\times((24\times j)+2)]-[R\times((24\times p)+2)]$ is not divisible by 4 and 6 for at least one pair of j and p, and j=0, 1, . . . , 3, p=0, 1, . . . , 3.

3. The method of claim 1, comprised of:

determining four redundancy versions in the circular buffer; and modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j)=R\times((24\times j)+2)+\delta^{RV}(j),$$

where j is the index of the redundancy version, $R=\lceil K/32\rceil$, K is the size of the certain interleaver, $\delta^{RV}(j)$ is determined in dependence upon $\Delta'(j,p)=[R\times((24\times j)+2)]-[R\times((24\times p)+2)]$ for at least one pair of j and p, and j=0, 1, . . . , 3, p=0, 1, . . . , 3, with:

when the Quadrature phase-shift keying (QPSK) modulation is used for modulating the subset of bits, $\delta^{RV}(j)$ being set to be zero;

when the 16-Quadrature amplitude modulation (QAM) is used for modulating the subset of bits:

when $\Delta'(j,p)/4$ is an integer number, $\delta^{RV}(j)$ being an integer selected from a set $\{1, 2, 3\}$; and when $\Delta'(j,p)/4$ is not an integer number, $\delta^{RV}(j)$ being set to be zero; and when the 64-Quadrature amplitude modulation (QAM) is used for modulating the subset of bits:

when $\Delta'(j,p)/6$ is an integer number, $\delta^{RV}(j)$ being an integer selected from a set $\{1, 2, 3, 4, 5\}$; and when $\Delta'(j,p)/6$ is not an integer number, $\delta^{RV}(j)$ being set to be zero.

4. The method of claim 1, comprised of:

determining four redundancy versions in the circular buffer; and modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j)=R\times((G\times j)+2),$$

where j is the index of the redundancy version and j=0, 1, . . . , 3, $R=\lceil K/32\rceil$, K is the size of the certain interleaver, and G is an integer that is not divisible by at least one of 4 and 6.

5. The method of claim 1, comprised of determining a size of the circular buffer, with the size L being a number that is not divisible by at least one modulation order.

6. The method of claim 1, comprised of interleaving each of the sub-blocks of coded bits by using a row-column interleaver, and for each sub-block:

writing the sub-block of coded bits into the row-column interleaver in a row-by-row manner by starting from the first row and the first column, with the row-column interleaver having C columns and R rows, and the number of coded bits in the sub-block being D;

when the row-column interleaver is not filled up by the coded bits in the sub-block, filling up the row-column interleaver with dummy bits, with the number of dummy bits being $Y=R\times C-D$;

permuting the columns in the row-column interleaver by using a certain pattern;

reading the bits from the row-column interleaver in a column-by-column manner by staring from the first row and the first column; and removing the dummy bits from the bits that are read from the row-column interleaver.

7. The method of claim 6, comprised of:

determining four redundancy versions in the circular buffer; and modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j)=R\times((24\times j)+2)+\delta^{RV}(j),$$

where j is the index of the redundancy version and j=0, 1, . . . , 3, and $\delta^{RV}(j)$ is determined in dependence upon the number of dummy bits Y.

8. The method of claim 7, comprised of the number of dummy bits Y being one of 4, 12, 20 and 28, and $\delta^{RV}(j)$ being determined based on the following table:

|    | RV(0), j = 0 | RV(1), j = 1 | RV(2), j = 2 | RV(3), j = 3 |
|----|---|---|---|---|
| Y1 | 0 | 0 | 0 | 1 |
| Y2 | 0 | 0 | 0 | 1 |
| Y3 | 0 | 0 | 0 | 3 |
| Y4 | 0 | 0 | 1 | 0. |

9. The method of claim 1, comprised of:

determining four redundancy versions in the circular buffer;

modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j)=R\times((24\times j)+2)+\delta^{RV}(j),$$

where j is the index of the redundancy version and j=0, 1, . . . , 3, $R=\lceil K/32\rceil$, K is the size of the certain interleaver, $\delta^{RV}(j)$ is determined in dependence upon j and the size of the quadratic permutation polynomial (QPP) interleaver, and $\delta^{RV}(j)=0$ for $j=0$, and $\delta^{RV}(j)$ is determined based upon the following table for $j=1, 2, 3$:

| i | j = 1 | j = 2 | j = 3 |
|---|---|---|---|
| 1 | 0 | 1 | 0 |
| 2 | 0 | 0 | 3 |
| 3 | 0 | 5 | 4 |
| 4 | 3 | 1 | 4 |
| 5 | 0 | 1 | 0 |
| 6 | 0 | 0 | 3 |
| 7 | 0 | 5 | 4 |
| 8 | 3 | 1 | 4 |
| 9 | 0 | 1 | 0 |
| 10 | 0 | 0 | 3 |
| 11 | 0 | 5 | 4 |
| 12 | 3 | 1 | 4 |
| 13 | 0 | 1 | 0 |
| 14 | 0 | 0 | 3 |
| 15 | 0 | 5 | 4 |
| 16 | 3 | 1 | 4 |
| 17 | 0 | 1 | 0 |
| 18 | 0 | 0 | 3 |
| 19 | 0 | 5 | 4 |
| 20 | 3 | 1 | 4 |
| 21 | 0 | 1 | 0 |
| 22 | 0 | 0 | 3 |
| 23 | 0 | 5 | 4 |
| 24 | 3 | 1 | 4 |
| 25 | 0 | 1 | 0 |
| 26 | 0 | 0 | 3 |
| 27 | 0 | 5 | 4 |
| 28 | 3 | 1 | 4 |
| 29 | 0 | 1 | 0 |
| 30 | 0 | 0 | 3 |
| 31 | 0 | 5 | 4 |
| 32 | 3 | 1 | 4 |
| 33 | 0 | 1 | 0 |
| 34 | 0 | 0 | 3 |
| 35 | 0 | 5 | 4 |
| 36 | 3 | 1 | 4 |
| 37 | 0 | 1 | 0 |
| 38 | 0 | 0 | 3 |
| 39 | 0 | 5 | 4 |
| 40 | 3 | 1 | 4 |
| 41 | 0 | 1 | 0 |
| 42 | 0 | 0 | 3 |
| 43 | 0 | 5 | 4 |
| 44 | 3 | 1 | 4 |
| 45 | 0 | 1 | 0 |
| 46 | 0 | 0 | 3 |
| 47 | 0 | 5 | 4 |
| 48 | 3 | 1 | 4 |
| 49 | 0 | 1 | 0 |
| 50 | 0 | 0 | 3 |
| 51 | 0 | 5 | 4 |
| 52 | 3 | 1 | 4 |
| 53 | 0 | 1 | 0 |
| 54 | 0 | 0 | 3 |
| 55 | 0 | 5 | 4 |
| 56 | 3 | 1 | 4 |
| 57 | 0 | 1 | 0 |
| 58 | 0 | 0 | 3 |
| 59 | 0 | 5 | 4 |
| 60 | 3 | 1 | 4 |
| 61 | 0 | 0 | 3 |
| 62 | 3 | 1 | 4 |
| 63 | 0 | 0 | 3 |
| 64 | 3 | 1 | 4 |
| 65 | 0 | 0 | 3 |
| 66 | 3 | 1 | 4 |
| 67 | 0 | 0 | 3 |
| 68 | 3 | 1 | 4 |
| 69 | 0 | 0 | 3 |
| 70 | 3 | 1 | 4 |
| 71 | 0 | 0 | 3 |
| 72 | 3 | 1 | 4 |
| 73 | 0 | 0 | 3 |
| 74 | 3 | 1 | 4 |
| 75 | 0 | 0 | 3 |
| 76 | 3 | 1 | 4 |
| 77 | 0 | 0 | 3 |
| 78 | 3 | 1 | 4 |
| 79 | 0 | 0 | 3 |
| 80 | 3 | 1 | 4 |
| 81 | 0 | 0 | 3 |
| 82 | 3 | 1 | 4 |
| 83 | 0 | 0 | 3 |
| 84 | 3 | 1 | 4 |
| 85 | 0 | 0 | 3 |
| 86 | 3 | 1 | 4 |
| 87 | 0 | 0 | 3 |
| 88 | 3 | 1 | 4 |
| 89 | 0 | 0 | 3 |
| 90 | 3 | 1 | 4 |
| 91 | 0 | 0 | 3 |
| 92 | 3 | 1 | 4 |
| 93 | 3 | 1 | 4 |
| 94 | 3 | 1 | 4 |
| 95 | 3 | 1 | 4 |
| 96 | 3 | 1 | 4 |
| 97 | 3 | 1 | 4 |
| 98 | 3 | 1 | 4 |
| 99 | 3 | 1 | 4 |
| 100 | 3 | 1 | 4 |
| 101 | 3 | 1 | 4 |
| 102 | 3 | 1 | 4 |
| 103 | 3 | 1 | 4 |
| 104 | 3 | 1 | 4 |
| 105 | 3 | 1 | 4 |
| 106 | 3 | 1 | 4 |
| 107 | 3 | 1 | 4 |
| 108 | 3 | 1 | 4 |
| 109 | 3 | 1 | 4 |
| 110 | 3 | 1 | 4 |
| 111 | 3 | 1 | 4 |
| 112 | 3 | 1 | 4 |
| 113 | 3 | 1 | 4 |
| 114 | 3 | 1 | 4 |
| 115 | 3 | 1 | 4 |
| 116 | 3 | 1 | 4 |
| 117 | 3 | 1 | 4 |
| 118 | 3 | 1 | 4 |
| 119 | 3 | 1 | 4 |
| 120 | 3 | 1 | 4 |
| 121 | 3 | 1 | 4 |
| 122 | 3 | 1 | 4 |
| 123 | 3 | 1 | 4 |
| 124 | 3 | 1 | 4 |
| 125 | 3 | 1 | 4 |
| 126 | 3 | 1 | 4 |
| 127 | 3 | 1 | 4 |
| 128 | 3 | 1 | 4 |
| 129 | 3 | 1 | 4 |
| 130 | 3 | 1 | 4 |
| 131 | 3 | 1 | 4 |
| 132 | 3 | 1 | 4 |
| 133 | 3 | 1 | 4 |
| 134 | 3 | 1 | 4 |
| 135 | 3 | 1 | 4 |
| 136 | 3 | 1 | 4 |
| 137 | 3 | 1 | 4 |
| 138 | 3 | 1 | 4 |
| 139 | 3 | 1 | 4 |
| 140 | 3 | 1 | 4 |
| 141 | 3 | 1 | 4 |
| 142 | 3 | 1 | 4 |
| 143 | 3 | 1 | 4 |
| 144 | 3 | 1 | 4 |
| 145 | 3 | 1 | 4 |
| 146 | 3 | 1 | 4 |
| 147 | 3 | 1 | 4 |
| 148 | 3 | 1 | 4 |
| 149 | 3 | 1 | 4 |
| 150 | 3 | 1 | 4 |
| 151 | 3 | 1 | 4 |

| i | j = 1 | j = 2 | j = 3 |
|---|---|---|---|
| 152 | 3 | 1 | 4 |
| 153 | 3 | 1 | 4 |
| 154 | 3 | 1 | 4 |
| 155 | 3 | 1 | 4 |
| 156 | 3 | 1 | 4 |
| 157 | 3 | 1 | 4 |
| 158 | 3 | 1 | 4 |
| 159 | 3 | 1 | 4 |
| 160 | 3 | 1 | 4 |
| 161 | 3 | 1 | 4 |
| 162 | 3 | 1 | 4 |
| 163 | 3 | 1 | 4 |
| 164 | 3 | 1 | 4 |
| 165 | 3 | 1 | 4 |
| 166 | 3 | 1 | 4 |
| 167 | 3 | 1 | 4 |
| 168 | 3 | 1 | 4 |
| 169 | 3 | 1 | 4 |
| 170 | 3 | 1 | 4 |
| 171 | 3 | 1 | 4 |
| 172 | 3 | 1 | 4 |
| 173 | 3 | 1 | 4 |
| 174 | 3 | 1 | 4 |
| 175 | 3 | 1 | 4 |
| 176 | 3 | 1 | 4 |
| 177 | 3 | 1 | 4 |
| 178 | 3 | 1 | 4 |
| 179 | 3 | 1 | 4 |
| 180 | 3 | 1 | 4 |
| 181 | 3 | 1 | 4 |
| 182 | 3 | 1 | 4 |
| 183 | 3 | 1 | 4 |
| 184 | 3 | 1 | 4 |
| 185 | 3 | 1 | 4 |
| 186 | 3 | 1 | 4 |
| 187 | 3 | 1 | 4 |
| 188 | 3 | 1 | 4 | where i is the interleaver size index, i=1, 2, 3, . . . , 187, 188, and i is determined in dependence upon an interleaver size K based on the following table:

| i | $K_i$ |
|---|---|
| 1 | 40 |
| 2 | 48 |
| 3 | 56 |
| 4 | 64 |
| 5 | 72 |
| 6 | 80 |
| 7 | 88 |
| 8 | 96 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 216 |
| 24 | 224 |
| 25 | 232 |
| 26 | 240 |
| 27 | 248 |
| 28 | 256 |
| 29 | 264 |
| 30 | 272 |
| 31 | 280 |
| 32 | 288 |
| 33 | 296 |
| 34 | 304 |
| 35 | 312 |
| 36 | 320 |
| 37 | 328 |
| 38 | 336 |
| 39 | 344 |
| 40 | 352 |
| 41 | 360 |
| 42 | 368 |
| 43 | 376 |
| 44 | 384 |
| 45 | 392 |
| 46 | 400 |
| 47 | 408 |
| 48 | 416 |
| 49 | 424 |
| 50 | 432 |
| 51 | 440 |
| 52 | 448 |
| 53 | 456 |
| 54 | 464 |
| 55 | 472 |
| 56 | 480 |
| 57 | 488 |
| 58 | 496 |
| 59 | 504 |
| 60 | 512 |
| 61 | 528 |
| 62 | 544 |
| 63 | 560 |
| 64 | 576 |
| 65 | 592 |
| 66 | 608 |
| 67 | 624 |
| 68 | 640 |
| 69 | 656 |
| 70 | 672 |
| 71 | 688 |
| 72 | 704 |
| 73 | 720 |
| 74 | 736 |
| 75 | 752 |
| 76 | 768 |
| 77 | 784 |
| 78 | 800 |
| 79 | 816 |
| 80 | 832 |
| 81 | 848 |
| 82 | 864 |
| 83 | 880 |
| 84 | 896 |
| 85 | 912 |
| 86 | 928 |
| 87 | 944 |
| 88 | 960 |
| 89 | 976 |
| 90 | 992 |
| 91 | 1008 |
| 92 | 1024 |
| 93 | 1056 |
| 94 | 1088 |
| 95 | 1120 |
| 96 | 1152 |
| 97 | 1184 |
| 98 | 1216 |
| 99 | 1248 |
| 100 | 1280 |
| 101 | 1312 |
| 102 | 1344 |
| 103 | 1376 |
| 104 | 1408 |
| 105 | 1440 |
| 106 | 1472 |
| 107 | 1504 |
| 108 | 1536 |

| i | $K_i$ |
|---|---|
| 109 | 1568 |
| 110 | 1600 |
| 111 | 1632 |
| 112 | 1664 |
| 113 | 1696 |
| 114 | 1728 |
| 115 | 1760 |
| 116 | 1792 |
| 117 | 1824 |
| 118 | 1856 |
| 119 | 1888 |
| 120 | 1920 |
| 121 | 1952 |
| 122 | 1984 |
| 123 | 2016 |
| 124 | 2048 |
| 125 | 2112 |
| 126 | 2176 |
| 127 | 2240 |
| 128 | 2304 |
| 129 | 2368 |
| 130 | 2432 |
| 131 | 2496 |
| 132 | 2560 |
| 133 | 2624 |
| 134 | 2688 |
| 135 | 2752 |
| 136 | 2816 |
| 137 | 2880 |
| 138 | 2944 |
| 139 | 3008 |
| 140 | 3072 |
| 141 | 3136 |
| 142 | 3200 |
| 143 | 3264 |
| 144 | 3328 |
| 145 | 3392 |
| 146 | 3456 |
| 147 | 3520 |
| 148 | 3584 |
| 149 | 3648 |
| 150 | 3712 |
| 151 | 3776 |
| 152 | 3840 |
| 153 | 3904 |
| 154 | 3968 |
| 155 | 4032 |
| 156 | 4096 |
| 157 | 4160 |
| 158 | 4224 |
| 159 | 4288 |
| 160 | 4352 |
| 161 | 4416 |
| 162 | 4480 |
| 163 | 4544 |
| 164 | 4608 |
| 165 | 4672 |
| 166 | 4736 |
| 167 | 4800 |
| 168 | 4864 |
| 169 | 4928 |
| 170 | 4992 |
| 171 | 5056 |
| 172 | 5120 |
| 173 | 5184 |
| 174 | 5248 |
| 175 | 5312 |
| 176 | 5376 |
| 177 | 5440 |
| 178 | 5504 |
| 179 | 5568 |
| 180 | 5632 |
| 181 | 5696 |
| 182 | 5760 |
| 183 | 5824 |
| 184 | 5888 |
| 185 | 5952 |
| 186 | 6016 |
| 187 | 6080 |
| 188 | 6144. |

10. The method of claim 1, comprised of:

determining four redundancy versions in the circular buffer;

modulating the subset of bits by using one of a Quadrature phase-shift keying (QPSK) modulation, a 16-Quadrature amplitude modulation (QAM) and a 64-Quadrature amplitude modulation (QAM), with the starting bit index of a redundancy version being established by:

$$RV(j) = R \times ((28 \times j) + 2) + \delta^{RV}(j),$$

where j is the index of the redundancy version and j=0, 1, ..., 3, $R = \lceil K/32 \rceil$, K is the size of the certain interleaver, $\delta^{RV}(j)$ is determined in dependence upon j and the size of the quadratic permutation polynomial (QPP) interleaver, and $\delta^{RV}(j) = 0$ for j=0, and $\delta^{RV}(j)$ is determined based upon the following table for j=1, 2, 3:

| i | j = 1 | j = 2 | j = 3 |
|---|---|---|---|
| 1 | 0 | 1 | 3 |
| 2 | 0 | 5 | 3 |
| 3 | 0 | 1 | 1 |
| 4 | 0 | 0 | 4 |
| 5 | 0 | 2 | 2 |
| 6 | 1 | 2 | 1 |
| 7 | 0 | 2 | 0 |
| 8 | 3 | 1 | 0 |
| 9 | 0 | 1 | 3 |
| 10 | 0 | 1 | 3 |
| 11 | 0 | 1 | 1 |
| 12 | 0 | 5 | 0 |
| 13 | 0 | 1 | 3 |
| 14 | 0 | 5 | 3 |
| 15 | 0 | 1 | 1 |
| 16 | 0 | 0 | 4 |
| 17 | 0 | 2 | 2 |
| 18 | 1 | 2 | 1 |
| 19 | 0 | 2 | 0 |
| 20 | 3 | 1 | 0 |
| 21 | 0 | 1 | 3 |
| 22 | 0 | 1 | 3 |
| 23 | 0 | 1 | 1 |
| 24 | 0 | 5 | 0 |
| 25 | 0 | 1 | 3 |
| 26 | 0 | 5 | 3 |
| 27 | 0 | 1 | 1 |
| 28 | 0 | 0 | 4 |
| 29 | 0 | 2 | 2 |
| 30 | 1 | 2 | 1 |
| 31 | 0 | 2 | 0 |
| 32 | 3 | 1 | 0 |
| 33 | 0 | 1 | 3 |
| 34 | 0 | 1 | 3 |
| 35 | 0 | 1 | 1 |
| 36 | 0 | 5 | 0 |
| 37 | 0 | 1 | 3 |
| 38 | 0 | 5 | 3 |
| 39 | 0 | 1 | 1 |
| 40 | 0 | 0 | 4 |
| 41 | 0 | 2 | 2 |
| 42 | 1 | 2 | 1 |
| 43 | 0 | 2 | 0 |
| 44 | 3 | 1 | 0 |
| 45 | 0 | 1 | 3 |
| 46 | 0 | 1 | 3 |
| 47 | 0 | 1 | 1 |
| 48 | 0 | 5 | 0 |
| 49 | 0 | 1 | 3 |

-continued

| i | j = 1 | j = 2 | j = 3 |
|---|---|---|---|
| 50 | 0 | 5 | 3 |
| 51 | 0 | 1 | 1 |
| 52 | 0 | 0 | 4 |
| 53 | 0 | 2 | 2 |
| 54 | 1 | 2 | 1 |
| 55 | 0 | 2 | 0 |
| 56 | 3 | 1 | 0 |
| 57 | 0 | 1 | 3 |
| 58 | 0 | 1 | 3 |
| 59 | 0 | 1 | 1 |
| 60 | 0 | 5 | 0 |
| 61 | 0 | 5 | 3 |
| 62 | 0 | 0 | 4 |
| 63 | 1 | 2 | 1 |
| 64 | 3 | 1 | 0 |
| 65 | 0 | 1 | 3 |
| 66 | 0 | 5 | 0 |
| 67 | 0 | 5 | 3 |
| 68 | 0 | 0 | 4 |
| 69 | 1 | 2 | 1 |
| 70 | 3 | 1 | 0 |
| 71 | 0 | 1 | 3 |
| 72 | 0 | 5 | 0 |
| 73 | 0 | 5 | 3 |
| 74 | 0 | 0 | 4 |
| 75 | 1 | 2 | 1 |
| 76 | 3 | 1 | 0 |
| 77 | 0 | 1 | 3 |
| 78 | 0 | 5 | 0 |
| 79 | 0 | 5 | 3 |
| 80 | 0 | 0 | 4 |
| 81 | 1 | 2 | 1 |
| 82 | 3 | 1 | 0 |
| 83 | 0 | 1 | 3 |
| 84 | 0 | 5 | 0 |
| 85 | 0 | 5 | 3 |
| 86 | 0 | 0 | 4 |
| 87 | 1 | 2 | 1 |
| 88 | 3 | 1 | 0 |
| 89 | 0 | 1 | 3 |
| 90 | 0 | 5 | 0 |
| 91 | 0 | 5 | 3 |
| 92 | 0 | 0 | 4 |
| 93 | 3 | 1 | 0 |
| 94 | 0 | 5 | 0 |
| 95 | 0 | 0 | 4 |
| 96 | 3 | 1 | 0 |
| 97 | 0 | 5 | 0 |
| 98 | 0 | 0 | 4 |
| 99 | 3 | 1 | 0 |
| 100 | 0 | 5 | 0 |
| 101 | 0 | 0 | 4 |
| 102 | 3 | 1 | 0 |
| 103 | 0 | 5 | 0 |
| 104 | 0 | 0 | 4 |
| 105 | 3 | 1 | 0 |
| 106 | 0 | 5 | 0 |
| 107 | 0 | 0 | 4 |
| 108 | 3 | 1 | 0 |
| 109 | 0 | 5 | 0 |
| 110 | 0 | 0 | 4 |
| 111 | 3 | 1 | 0 |
| 112 | 0 | 5 | 0 |
| 113 | 0 | 0 | 4 |
| 114 | 3 | 1 | 0 |
| 115 | 0 | 5 | 0 |
| 116 | 0 | 0 | 4 |
| 117 | 3 | 1 | 0 |
| 118 | 0 | 5 | 0 |
| 119 | 0 | 0 | 4 |
| 120 | 3 | 1 | 0 |
| 121 | 0 | 5 | 0 |
| 122 | 0 | 0 | 4 |
| 123 | 3 | 1 | 0 |
| 124 | 0 | 5 | 0 |
| 125 | 3 | 1 | 0 |
| 126 | 0 | 0 | 4 |
| 127 | 0 | 5 | 0 |
| 128 | 3 | 1 | 0 |
| 129 | 0 | 0 | 4 |
| 130 | 0 | 5 | 0 |
| 131 | 3 | 1 | 0 |
| 132 | 0 | 0 | 4 |
| 133 | 0 | 5 | 0 |
| 134 | 3 | 1 | 0 |
| 135 | 0 | 0 | 4 |
| 136 | 0 | 5 | 0 |
| 137 | 3 | 1 | 0 |
| 138 | 0 | 0 | 4 |
| 139 | 0 | 5 | 0 |
| 140 | 3 | 1 | 0 |
| 141 | 0 | 0 | 4 |
| 142 | 0 | 5 | 0 |
| 143 | 3 | 1 | 0 |
| 144 | 0 | 0 | 4 |
| 145 | 0 | 5 | 0 |
| 146 | 3 | 1 | 0 |
| 147 | 0 | 0 | 4 |
| 148 | 0 | 5 | 0 |
| 149 | 3 | 1 | 0 |
| 150 | 0 | 0 | 4 |
| 151 | 0 | 5 | 0 |
| 152 | 3 | 1 | 0 |
| 153 | 0 | 0 | 4 |
| 154 | 0 | 5 | 0 |
| 155 | 3 | 1 | 0 |
| 156 | 0 | 0 | 4 |
| 157 | 0 | 5 | 0 |
| 158 | 3 | 1 | 0 |
| 159 | 0 | 0 | 4 |
| 160 | 0 | 5 | 0 |
| 161 | 3 | 1 | 0 |
| 162 | 0 | 0 | 4 |
| 163 | 0 | 5 | 0 |
| 164 | 3 | 1 | 0 |
| 165 | 0 | 0 | 4 |
| 166 | 0 | 5 | 0 |
| 167 | 3 | 1 | 0 |
| 168 | 0 | 0 | 4 |
| 169 | 0 | 5 | 0 |
| 170 | 3 | 1 | 0 |
| 171 | 0 | 0 | 4 |
| 172 | 0 | 5 | 0 |
| 173 | 3 | 1 | 0 |
| 174 | 0 | 0 | 4 |
| 175 | 0 | 5 | 0 |
| 176 | 3 | 1 | 0 |
| 177 | 0 | 0 | 4 |
| 178 | 0 | 5 | 0 |
| 179 | 3 | 1 | 0 |
| 180 | 0 | 0 | 4 |
| 181 | 0 | 5 | 0 |
| 182 | 3 | 1 | 0 |
| 183 | 0 | 0 | 4 |
| 184 | 0 | 5 | 0 |
| 185 | 3 | 1 | 0 |
| 186 | 0 | 0 | 4 |
| 187 | 0 | 5 | 0 |
| 188 | 3 | 1 | 0 | where i is the interleaver size index, i=1, 2, 3, ..., 187, 188, and i is determined in dependence upon an interleaver size K based on the following table:

| i | $K_i$ |
|---|---|
| 1 | 40 |
| 2 | 48 |
| 3 | 56 |
| 4 | 64 |
| 5 | 72 |
| 6 | 80 |

| i | $K_i$ |
|---|---|
| 7 | 88 |
| 8 | 96 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 216 |
| 24 | 224 |
| 25 | 232 |
| 26 | 240 |
| 27 | 248 |
| 28 | 256 |
| 29 | 264 |
| 30 | 272 |
| 31 | 280 |
| 32 | 288 |
| 33 | 296 |
| 34 | 304 |
| 35 | 312 |
| 36 | 320 |
| 37 | 328 |
| 38 | 336 |
| 39 | 344 |
| 40 | 352 |
| 41 | 360 |
| 42 | 368 |
| 43 | 376 |
| 44 | 384 |
| 45 | 392 |
| 46 | 400 |
| 47 | 408 |
| 48 | 416 |
| 49 | 424 |
| 50 | 432 |
| 51 | 440 |
| 52 | 448 |
| 53 | 456 |
| 54 | 464 |
| 55 | 472 |
| 56 | 480 |
| 57 | 488 |
| 58 | 496 |
| 59 | 504 |
| 60 | 512 |
| 61 | 528 |
| 62 | 544 |
| 63 | 560 |
| 64 | 576 |
| 65 | 592 |
| 66 | 608 |
| 67 | 624 |
| 68 | 640 |
| 69 | 656 |
| 70 | 672 |
| 71 | 688 |
| 72 | 704 |
| 73 | 720 |
| 74 | 736 |
| 75 | 752 |
| 76 | 768 |
| 77 | 784 |
| 78 | 800 |
| 79 | 816 |
| 80 | 832 |
| 81 | 848 |
| 82 | 864 |
| 83 | 880 |
| 84 | 896 |
| 85 | 912 |
| 86 | 928 |
| 87 | 944 |
| 88 | 960 |
| 89 | 976 |
| 90 | 992 |
| 91 | 1008 |
| 92 | 1024 |
| 93 | 1056 |
| 94 | 1088 |
| 95 | 1120 |
| 96 | 1152 |
| 97 | 1184 |
| 98 | 1216 |
| 99 | 1248 |
| 100 | 1280 |
| 101 | 1312 |
| 102 | 1344 |
| 103 | 1376 |
| 104 | 1408 |
| 105 | 1440 |
| 106 | 1472 |
| 107 | 1504 |
| 108 | 1536 |
| 109 | 1568 |
| 110 | 1600 |
| 111 | 1632 |
| 112 | 1664 |
| 113 | 1696 |
| 114 | 1728 |
| 115 | 1760 |
| 116 | 1792 |
| 117 | 1824 |
| 118 | 1856 |
| 119 | 1888 |
| 120 | 1920 |
| 121 | 1952 |
| 122 | 1984 |
| 123 | 2016 |
| 124 | 2048 |
| 125 | 2112 |
| 126 | 2176 |
| 127 | 2240 |
| 128 | 2304 |
| 129 | 2368 |
| 130 | 2432 |
| 131 | 2496 |
| 132 | 2560 |
| 133 | 2624 |
| 134 | 2688 |
| 135 | 2752 |
| 136 | 2816 |
| 137 | 2880 |
| 138 | 2944 |
| 139 | 3008 |
| 140 | 3072 |
| 141 | 3136 |
| 142 | 3200 |
| 143 | 3264 |
| 144 | 3328 |
| 145 | 3392 |
| 146 | 3456 |
| 147 | 3520 |
| 148 | 3584 |
| 149 | 3648 |
| 150 | 3712 |
| 151 | 3776 |
| 152 | 3840 |
| 153 | 3904 |
| 154 | 3968 |
| 155 | 4032 |
| 156 | 4096 |
| 157 | 4160 |
| 158 | 4224 |
| 159 | 4288 |
| 160 | 4352 |
| 161 | 4416 |
| 162 | 4480 |

| i | $K_i$ |
|---|---|
| 163 | 4544 |
| 164 | 4608 |
| 165 | 4672 |
| 166 | 4736 |
| 167 | 4800 |
| 168 | 4864 |
| 169 | 4928 |
| 170 | 4992 |
| 171 | 5056 |
| 172 | 5120 |
| 173 | 5184 |
| 174 | 5248 |
| 175 | 5312 |
| 176 | 5376 |
| 177 | 5440 |
| 178 | 5504 |
| 179 | 5568 |
| 180 | 5632 |
| 181 | 5696 |
| 182 | 5760 |
| 183 | 5824 |
| 184 | 5888 |
| 185 | 5952 |
| 186 | 6016 |
| 187 | 6080 |
| 188 | 6144. |

11. The method of claim 1, comprised of interleaving each of the sub-blocks of coded bits by using a quadratic permutation polynomial (QPP) interleaver.

12. A method for receiving data, the method comprising the steps of:
receiving a plurality of blocks of data bits via at least one antenna;
de-modulating the plurality of blocks of data bits by using a certain modulation scheme;
determining a plurality of redundancy versions in a circular buffer, with each redundancy version corresponding to a starting bit index in the circular buffer, and in at least one pair of redundancy versions, the number of bits between the starting point of a first redundancy version and the starting point of a second redundancy version being not divisible by the modulation order of the certain modulation scheme;
writing the plurality of blocks of de-modulated bits into the circular buffer, with each block of de-modulated bits being written in accordance with a redundancy version selected from among the plurality of redundancy versions;
segmenting the bits written into the circular buffer into a plurality of sub-blocks of bits;
interleaving each of the sub-blocks of bits by using a certain interleaver;
collecting the interleaved bits from the plurality of sub-blocks to generate a collected block of bits; and
decoding the collected block of bits by using a certain decoding scheme.

13. The method of claim 12, comprised of:
de-modulating the plurality of blocks of data bits by using one of a Quadrature phase-shift keying (QPSK) modulation, a 16-Quadrature amplitude modulation (QAM) and a 64-Quadrature amplitude modulation (QAM); and
determining four redundancy versions in the circular buffer, with the starting bit index of a redundancy version being established by:

$$RV(j) = R \times ((24 \times j) + 2) + \delta^{RV}(j),$$

where j is the index of the redundancy version, $R = \lceil K/32 \rceil$, K is the size of the certain interleaver, $\delta^{RV}(j)$ is determined such that $\Delta'(j,p) = [R \times ((24 \times j) + 2)] - [R \times ((24 \times p) + 2)]$ is not divisible by 4 and 6 for at least one pair of j and p, and $j = 0, 1, \ldots, 3$, $p = 0, 1, \ldots, 3$.

14. The method of claim 12, comprised of:
de-modulating the subset of bits by using one of a Quadrature phase-shift keying (QPSK) modulation, a 16-Quadrature amplitude modulation (QAM) and a 64-Quadrature amplitude modulation (QAM); and
determining four redundancy versions in the circular buffer, with the starting bit index of a redundancy version being established by:

$$RV(j) = R \times ((24 \times j) + 2) + \delta^{RV}(j),$$

where j is the index of the redundancy version, $R = \lceil K/32 \rceil$, K is the size of the certain interleaver, $\delta^{RV}(j)$ is determined in dependence upon $\Delta'(j,p)$ and $\Delta'(j,p) = [R \times ((24 \times j) + 2)] - [R \times ((24 \times p) + 2)]$ for at least one pair of j and p, and $j = 0, 1, \ldots, 3$, $p = 0, 1, \ldots, 3$, with:
when the Quadrature phase-shift keying (QPSK) modulation is used for de-modulating the plurality of blocks of data bits, $\delta^{RV}(j)$ being set to be zero;
when the 16-Quadrature amplitude modulation (QAM) is used for de-modulating the plurality of blocks of data bits:
when $\Delta'(j,p)/4$ is an integer number, $\delta^{RV}(j)$ being an integer selected from a set $\{1, 2, 3\}$; and
when $\Delta'(j,p)/4$ is not an integer number, $\delta^{RV}(j)$ being set to be zero; and
when the 64-Quadrature amplitude modulation (QAM) is used for de-modulating the plurality of blocks of data bits:
when $\Delta'(j,p)/6$ is an integer number, $\delta^{RV}(j)$ being an integer selected from a set $\{1, 2, 3, 4, 5\}$; and
when $\Delta'(j,p)/6$ is not an integer number, $\delta^{RV}(j)$ being set to be zero.

15. The method of claim 12, comprised of:
de-modulating the plurality of blocks of data bits by using one of a Quadrature phase-shift keying (QPSK) modulation, a 16-Quadrature amplitude modulation (QAM) and a 64-Quadrature amplitude modulation (QAM); and
determining four redundancy versions in the circular buffer, with the starting bit index of a redundancy version being established by:

$$RV(j) = R \times ((G \times j) + 2),$$

where j is the index of the redundancy version and $j = 0, 1, \ldots, 3$, $R = \lceil K/32 \rceil$, K is the size of the certain interleaver, and G is an integer that is not divisible by at least one of 4 and 6.

16. The method of claim 12, comprised of determining a size of the circular buffer, with the size L being a number that is not divisible by at least one modulation order.

17. The method of claim 12, comprised of interleaving each of the sub-blocks of bits by using a row-column interleaver comprising, and, for each sub-block:
filling the sub-block of bits into the row-column interleaver in a row-by-row manner by starting from the first row and the first column, with the row-column interleaver having C columns and R rows, and the number of bits in the sub-block being D;
when the row-column interleaver is not filled up by the bits in the sub-block, filling up the row-column interleaver with dummy bits, with the number of dummy bits being $Y = R \times C - D$;
permuting the columns in the row-column interleaver by using a certain pattern;

reading the bits from the row-column interleaver in a column-by-column manner by staring from the first row and the first column; and removing the dummy bits from the bits that are read from the row-column interleaver.

18. The method of claim 17, comprised of:
de-modulating the plurality of blocks of data bits by using one of a Quadrature phase-shift keying (QPSK) modulation, a 16-Quadrature amplitude modulation (QAM) and a 64-Quadrature amplitude modulation (QAM); and determining four redundancy versions in the circular buffer, with the starting bit index of a redundancy version being established by:

$$RV(j)=R\times((24\times j)+2)+\delta^{RV}(j),$$

where j is the index of the redundancy version and j=0, 1, ..., 3, and $\delta^{RV}(j)$ is determined in dependence upon the number of dummy bits Y.

19. The method of claim 18, comprised of the number of dummy bits Y being one of 4, 12, 20 and 28, and $\delta^{RV}(j)$ being determined based on the following table:

|    | RV(0), j = 0 | RV(1), j = 1 | RV(2), j = 2 | RV(3), j = 3 |
|----|---|---|---|---|
| Y1 | 0 | 0 | 0 | 1 |
| Y2 | 0 | 0 | 0 | 1 |
| Y3 | 0 | 0 | 0 | 3 |
| Y4 | 0 | 0 | 1 | 0. |

20. The method of claim 12, comprised of:
de-modulating the plurality of blocks of data bits by using one of a Quadrature phase-shift keying (QPSK) modulation, a 16-Quadrature amplitude modulation (QAM) and a 64-Quadrature amplitude modulation (QAM); and determining four redundancy versions in the circular buffer, with the starting bit index of a redundancy version being established by:

$$RV(j)=R\times((24\times j)+2)+\delta^{RV}(j),$$

where j is the index of the redundancy version and j=0, 1, ..., 3, R=⌈K/32⌉, K is the size of the certain interleaver, $\delta^{RV}(j)$ is determined in dependence upon j and the size of the quadratic permutation polynomial (QPP) interleaver, and $\delta^{RV}(j)=0$ for j=0, and $\delta^{RV}(j)$ is determined based upon the following table for j=1, 2, 3:

| i  | j = 1 | j = 2 | j = 3 |
|----|-------|-------|-------|
| 1  | 0 | 1 | 0 |
| 2  | 0 | 0 | 3 |
| 3  | 0 | 5 | 4 |
| 4  | 3 | 1 | 4 |
| 5  | 0 | 1 | 0 |
| 6  | 0 | 0 | 3 |
| 7  | 0 | 5 | 4 |
| 8  | 3 | 1 | 4 |
| 9  | 0 | 1 | 0 |
| 10 | 0 | 0 | 3 |
| 11 | 0 | 5 | 4 |
| 12 | 3 | 1 | 4 |
| 13 | 0 | 1 | 0 |
| 14 | 0 | 0 | 3 |
| 15 | 0 | 5 | 4 |
| 16 | 3 | 1 | 4 |
| 17 | 0 | 1 | 0 |
| 18 | 0 | 0 | 3 |
| 19 | 0 | 5 | 4 |
| 20 | 3 | 1 | 4 |
| 21 | 0 | 1 | 0 |
| 22 | 0 | 0 | 3 |
| 23 | 0 | 5 | 4 |
| 24 | 3 | 1 | 4 |
| 25 | 0 | 1 | 0 |
| 26 | 0 | 0 | 3 |
| 27 | 0 | 5 | 4 |
| 28 | 3 | 1 | 4 |
| 29 | 0 | 1 | 0 |
| 30 | 0 | 0 | 3 |
| 31 | 0 | 5 | 4 |
| 32 | 3 | 1 | 4 |
| 33 | 0 | 1 | 0 |
| 34 | 0 | 0 | 3 |
| 35 | 0 | 5 | 4 |
| 36 | 3 | 1 | 4 |
| 37 | 0 | 1 | 0 |
| 38 | 0 | 0 | 3 |
| 39 | 0 | 5 | 4 |
| 40 | 3 | 1 | 4 |
| 41 | 0 | 1 | 0 |
| 42 | 0 | 0 | 3 |
| 43 | 0 | 5 | 4 |
| 44 | 3 | 1 | 4 |
| 45 | 0 | 1 | 0 |
| 46 | 0 | 0 | 3 |
| 47 | 0 | 5 | 4 |
| 48 | 3 | 1 | 4 |
| 49 | 0 | 1 | 0 |
| 50 | 0 | 0 | 3 |
| 51 | 0 | 5 | 4 |
| 52 | 3 | 1 | 4 |
| 53 | 0 | 1 | 0 |
| 54 | 0 | 0 | 3 |
| 55 | 0 | 5 | 4 |
| 56 | 3 | 1 | 4 |
| 57 | 0 | 1 | 0 |
| 58 | 0 | 0 | 3 |
| 59 | 0 | 5 | 4 |
| 60 | 3 | 1 | 4 |
| 61 | 0 | 0 | 3 |
| 62 | 3 | 1 | 4 |
| 63 | 0 | 0 | 3 |
| 64 | 3 | 1 | 4 |
| 65 | 0 | 0 | 3 |
| 66 | 3 | 1 | 4 |
| 67 | 0 | 0 | 3 |
| 68 | 3 | 1 | 4 |
| 69 | 0 | 0 | 3 |
| 70 | 3 | 1 | 4 |
| 71 | 0 | 0 | 3 |
| 72 | 3 | 1 | 4 |
| 73 | 0 | 0 | 3 |
| 74 | 3 | 1 | 4 |
| 75 | 0 | 0 | 3 |
| 76 | 3 | 1 | 4 |
| 77 | 0 | 0 | 3 |
| 78 | 3 | 1 | 4 |
| 79 | 0 | 0 | 3 |
| 80 | 3 | 1 | 4 |
| 81 | 0 | 0 | 3 |
| 82 | 3 | 1 | 4 |
| 83 | 0 | 0 | 3 |
| 84 | 3 | 1 | 4 |
| 85 | 0 | 0 | 3 |
| 86 | 3 | 1 | 4 |
| 87 | 0 | 0 | 3 |
| 88 | 3 | 1 | 4 |
| 89 | 0 | 0 | 3 |
| 90 | 3 | 1 | 4 |
| 91 | 0 | 0 | 3 |
| 92 | 3 | 1 | 4 |
| 93 | 3 | 1 | 4 |
| 94 | 3 | 1 | 4 |
| 95 | 3 | 1 | 4 |
| 96 | 3 | 1 | 4 |
| 97 | 3 | 1 | 4 |
| 98 | 3 | 1 | 4 |

| i | j = 1 | j = 2 | j = 3 |
|---|---|---|---|
| 99 | 3 | 1 | 4 |
| 100 | 3 | 1 | 4 |
| 101 | 3 | 1 | 4 |
| 102 | 3 | 1 | 4 |
| 103 | 3 | 1 | 4 |
| 104 | 3 | 1 | 4 |
| 105 | 3 | 1 | 4 |
| 106 | 3 | 1 | 4 |
| 107 | 3 | 1 | 4 |
| 108 | 3 | 1 | 4 |
| 109 | 3 | 1 | 4 |
| 110 | 3 | 1 | 4 |
| 111 | 3 | 1 | 4 |
| 112 | 3 | 1 | 4 |
| 113 | 3 | 1 | 4 |
| 114 | 3 | 1 | 4 |
| 115 | 3 | 1 | 4 |
| 116 | 3 | 1 | 4 |
| 117 | 3 | 1 | 4 |
| 118 | 3 | 1 | 4 |
| 119 | 3 | 1 | 4 |
| 120 | 3 | 1 | 4 |
| 121 | 3 | 1 | 4 |
| 122 | 3 | 1 | 4 |
| 123 | 3 | 1 | 4 |
| 124 | 3 | 1 | 4 |
| 125 | 3 | 1 | 4 |
| 126 | 3 | 1 | 4 |
| 127 | 3 | 1 | 4 |
| 128 | 3 | 1 | 4 |
| 129 | 3 | 1 | 4 |
| 130 | 3 | 1 | 4 |
| 131 | 3 | 1 | 4 |
| 132 | 3 | 1 | 4 |
| 133 | 3 | 1 | 4 |
| 134 | 3 | 1 | 4 |
| 135 | 3 | 1 | 4 |
| 136 | 3 | 1 | 4 |
| 137 | 3 | 1 | 4 |
| 138 | 3 | 1 | 4 |
| 139 | 3 | 1 | 4 |
| 140 | 3 | 1 | 4 |
| 141 | 3 | 1 | 4 |
| 142 | 3 | 1 | 4 |
| 143 | 3 | 1 | 4 |
| 144 | 3 | 1 | 4 |
| 145 | 3 | 1 | 4 |
| 146 | 3 | 1 | 4 |
| 147 | 3 | 1 | 4 |
| 148 | 3 | 1 | 4 |
| 149 | 3 | 1 | 4 |
| 150 | 3 | 1 | 4 |
| 151 | 3 | 1 | 4 |
| 152 | 3 | 1 | 4 |
| 153 | 3 | 1 | 4 |
| 154 | 3 | 1 | 4 |
| 155 | 3 | 1 | 4 |
| 156 | 3 | 1 | 4 |
| 157 | 3 | 1 | 4 |
| 158 | 3 | 1 | 4 |
| 159 | 3 | 1 | 4 |
| 160 | 3 | 1 | 4 |
| 161 | 3 | 1 | 4 |
| 162 | 3 | 1 | 4 |
| 163 | 3 | 1 | 4 |
| 164 | 3 | 1 | 4 |
| 165 | 3 | 1 | 4 |
| 166 | 3 | 1 | 4 |
| 167 | 3 | 1 | 4 |
| 168 | 3 | 1 | 4 |
| 169 | 3 | 1 | 4 |
| 170 | 3 | 1 | 4 |
| 171 | 3 | 1 | 4 |
| 172 | 3 | 1 | 4 |
| 173 | 3 | 1 | 4 |
| 174 | 3 | 1 | 4 |
| 175 | 3 | 1 | 4 |
| 176 | 3 | 1 | 4 |
| 177 | 3 | 1 | 4 |
| 178 | 3 | 1 | 4 |
| 179 | 3 | 1 | 4 |
| 180 | 3 | 1 | 4 |
| 181 | 3 | 1 | 4 |
| 182 | 3 | 1 | 4 |
| 183 | 3 | 1 | 4 |
| 184 | 3 | 1 | 4 |
| 185 | 3 | 1 | 4 |
| 186 | 3 | 1 | 4 |
| 187 | 3 | 1 | 4 |
| 188 | 3 | 1 | 4 | where i is the interleaver size index, i=1, 2, 3, . . . , 187, 188, and i is determined in dependence upon an interleaver size K based on the following table:

| i | $K_i$ |
|---|---|
| 1 | 40 |
| 2 | 48 |
| 3 | 56 |
| 4 | 64 |
| 5 | 72 |
| 6 | 80 |
| 7 | 88 |
| 8 | 96 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 216 |
| 24 | 224 |
| 25 | 232 |
| 26 | 240 |
| 27 | 248 |
| 28 | 256 |
| 29 | 264 |
| 30 | 272 |
| 31 | 280 |
| 32 | 288 |
| 33 | 296 |
| 34 | 304 |
| 35 | 312 |
| 36 | 320 |
| 37 | 328 |
| 38 | 336 |
| 39 | 344 |
| 40 | 352 |
| 41 | 360 |
| 42 | 368 |
| 43 | 376 |
| 44 | 384 |
| 45 | 392 |
| 46 | 400 |
| 47 | 408 |
| 48 | 416 |
| 49 | 424 |
| 50 | 432 |
| 51 | 440 |
| 52 | 448 |
| 53 | 456 |
| 54 | 464 |
| 55 | 472 |

-continued

| i | $K_i$ |
|---|---|
| 56 | 480 |
| 57 | 488 |
| 58 | 496 |
| 59 | 504 |
| 60 | 512 |
| 61 | 528 |
| 62 | 544 |
| 63 | 560 |
| 64 | 576 |
| 65 | 592 |
| 66 | 608 |
| 67 | 624 |
| 68 | 640 |
| 69 | 656 |
| 70 | 672 |
| 71 | 688 |
| 72 | 704 |
| 73 | 720 |
| 74 | 736 |
| 75 | 752 |
| 76 | 768 |
| 77 | 784 |
| 78 | 800 |
| 79 | 816 |
| 80 | 832 |
| 81 | 848 |
| 82 | 864 |
| 83 | 880 |
| 84 | 896 |
| 85 | 912 |
| 86 | 928 |
| 87 | 944 |
| 88 | 960 |
| 89 | 976 |
| 90 | 992 |
| 91 | 1008 |
| 92 | 1024 |
| 93 | 1056 |
| 94 | 1088 |
| 95 | 1120 |
| 96 | 1152 |
| 97 | 1184 |
| 98 | 1216 |
| 99 | 1248 |
| 100 | 1280 |
| 101 | 1312 |
| 102 | 1344 |
| 103 | 1376 |
| 104 | 1408 |
| 105 | 1440 |
| 106 | 1472 |
| 107 | 1504 |
| 108 | 1536 |
| 109 | 1568 |
| 110 | 1600 |
| 111 | 1632 |
| 112 | 1664 |
| 113 | 1696 |
| 114 | 1728 |
| 115 | 1760 |
| 116 | 1792 |
| 117 | 1824 |
| 118 | 1856 |
| 119 | 1888 |
| 120 | 1920 |
| 121 | 1952 |
| 122 | 1984 |
| 123 | 2016 |
| 124 | 2048 |
| 125 | 2112 |
| 126 | 2176 |
| 127 | 2240 |
| 128 | 2304 |
| 129 | 2368 |
| 130 | 2432 |
| 131 | 2496 |
| 132 | 2560 |
| 133 | 2624 |
| 134 | 2688 |
| 135 | 2752 |
| 136 | 2816 |
| 137 | 2880 |
| 138 | 2944 |
| 139 | 3008 |
| 140 | 3072 |
| 141 | 3136 |
| 142 | 3200 |
| 143 | 3264 |
| 144 | 3328 |
| 145 | 3392 |
| 146 | 3456 |
| 147 | 3520 |
| 148 | 3584 |
| 149 | 3648 |
| 150 | 3712 |
| 151 | 3776 |
| 152 | 3840 |
| 153 | 3904 |
| 154 | 3968 |
| 155 | 4032 |
| 156 | 4096 |
| 157 | 4160 |
| 158 | 4224 |
| 159 | 4288 |
| 160 | 4352 |
| 161 | 4416 |
| 162 | 4480 |
| 163 | 4544 |
| 164 | 4608 |
| 165 | 4672 |
| 166 | 4736 |
| 167 | 4800 |
| 168 | 4864 |
| 169 | 4928 |
| 170 | 4992 |
| 171 | 5056 |
| 172 | 5120 |
| 173 | 5184 |
| 174 | 5248 |
| 175 | 5312 |
| 176 | 5376 |
| 177 | 5440 |
| 178 | 5504 |
| 179 | 5568 |
| 180 | 5632 |
| 181 | 5696 |
| 182 | 5760 |
| 183 | 5824 |
| 184 | 5888 |
| 185 | 5952 |
| 186 | 6016 |
| 187 | 6080 |
| 188 | 6144. |

21. The method of claim 12, comprised of:

de-modulating the plurality of blocks of data bits by using one of a Quadrature phase-shift keying (QPSK) modulation, a 16-Quadrature amplitude modulation (QAM) and a 64-Quadrature amplitude modulation (QAM); and determining four redundancy versions in the circular buffer, with the starting bit index of a redundancy version being established by:

$$RV(j) = R \times ((24 \times j) + 2) + \delta^{RV}(j),$$

where j is the index of the redundancy version and j=0, 1, . . . , 3, R=⌈K/32⌉, K is the size of the certain interleaver, $\delta^{RV}(j)$ is determined in dependence upon j and the size of the quadratic permutation polynomial (QPP) interleaver, and $\delta^{RV}(j)=0$ for j=0, and $\delta^{RV}(j)$ is determined based upon the following table for j=1, 2, 3:

| i | j = 1 | j = 2 | j = 3 |
|---|---|---|---|
| 1 | 0 | 1 | 3 |
| 2 | 0 | 5 | 3 |
| 3 | 0 | 1 | 1 |
| 4 | 0 | 0 | 4 |
| 5 | 0 | 2 | 2 |
| 6 | 1 | 2 | 1 |
| 7 | 0 | 2 | 0 |
| 8 | 3 | 1 | 0 |
| 9 | 0 | 1 | 3 |
| 10 | 0 | 1 | 3 |
| 11 | 0 | 1 | 1 |
| 12 | 0 | 5 | 0 |
| 13 | 0 | 1 | 3 |
| 14 | 0 | 5 | 3 |
| 15 | 0 | 1 | 1 |
| 16 | 0 | 0 | 4 |
| 17 | 0 | 2 | 2 |
| 18 | 1 | 2 | 1 |
| 19 | 0 | 2 | 0 |
| 20 | 3 | 1 | 0 |
| 21 | 0 | 1 | 3 |
| 22 | 0 | 1 | 3 |
| 23 | 0 | 1 | 1 |
| 24 | 0 | 5 | 0 |
| 25 | 0 | 1 | 3 |
| 26 | 0 | 5 | 3 |
| 27 | 0 | 1 | 1 |
| 28 | 0 | 0 | 4 |
| 29 | 0 | 2 | 2 |
| 30 | 1 | 2 | 1 |
| 31 | 0 | 2 | 0 |
| 32 | 3 | 1 | 0 |
| 33 | 0 | 1 | 3 |
| 34 | 0 | 1 | 3 |
| 35 | 0 | 1 | 1 |
| 36 | 0 | 5 | 0 |
| 37 | 0 | 1 | 3 |
| 38 | 0 | 5 | 3 |
| 39 | 0 | 1 | 1 |
| 40 | 0 | 0 | 4 |
| 41 | 0 | 2 | 2 |
| 42 | 1 | 2 | 1 |
| 43 | 0 | 2 | 0 |
| 44 | 3 | 1 | 0 |
| 45 | 0 | 1 | 3 |
| 46 | 0 | 1 | 3 |
| 47 | 0 | 1 | 1 |
| 48 | 0 | 5 | 0 |
| 49 | 0 | 1 | 3 |
| 50 | 0 | 5 | 3 |
| 51 | 0 | 1 | 1 |
| 52 | 0 | 0 | 4 |
| 53 | 0 | 2 | 2 |
| 54 | 1 | 2 | 1 |
| 55 | 0 | 2 | 0 |
| 56 | 3 | 1 | 0 |
| 57 | 0 | 1 | 3 |
| 58 | 0 | 1 | 3 |
| 59 | 0 | 1 | 1 |
| 60 | 0 | 5 | 0 |
| 61 | 0 | 5 | 3 |
| 62 | 0 | 0 | 4 |
| 63 | 1 | 2 | 1 |
| 64 | 3 | 1 | 0 |
| 65 | 0 | 1 | 3 |
| 66 | 0 | 5 | 0 |
| 67 | 0 | 5 | 3 |
| 68 | 0 | 0 | 4 |
| 69 | 1 | 2 | 1 |
| 70 | 3 | 1 | 0 |
| 71 | 0 | 1 | 3 |
| 72 | 0 | 5 | 0 |
| 73 | 0 | 5 | 3 |
| 74 | 0 | 0 | 4 |
| 75 | 1 | 2 | 1 |
| 76 | 3 | 1 | 0 |
| 77 | 0 | 1 | 3 |
| 78 | 0 | 5 | 0 |
| 79 | 0 | 5 | 3 |
| 80 | 0 | 0 | 4 |
| 81 | 1 | 2 | 1 |
| 82 | 3 | 1 | 0 |
| 83 | 0 | 1 | 3 |
| 84 | 0 | 5 | 0 |
| 85 | 0 | 5 | 3 |
| 86 | 0 | 0 | 4 |
| 87 | 1 | 2 | 1 |
| 88 | 3 | 1 | 0 |
| 89 | 0 | 1 | 3 |
| 90 | 0 | 5 | 0 |
| 91 | 0 | 5 | 3 |
| 92 | 0 | 0 | 4 |
| 93 | 3 | 1 | 0 |
| 94 | 0 | 5 | 0 |
| 95 | 0 | 0 | 4 |
| 96 | 3 | 1 | 0 |
| 97 | 0 | 5 | 0 |
| 98 | 0 | 0 | 4 |
| 99 | 3 | 1 | 0 |
| 100 | 0 | 5 | 0 |
| 101 | 0 | 0 | 4 |
| 102 | 3 | 1 | 0 |
| 103 | 0 | 5 | 0 |
| 104 | 0 | 0 | 4 |
| 105 | 3 | 1 | 0 |
| 106 | 0 | 5 | 0 |
| 107 | 0 | 0 | 4 |
| 108 | 3 | 1 | 0 |
| 109 | 0 | 5 | 0 |
| 110 | 0 | 0 | 4 |
| 111 | 3 | 1 | 0 |
| 112 | 0 | 5 | 0 |
| 113 | 0 | 0 | 4 |
| 114 | 3 | 1 | 0 |
| 115 | 0 | 5 | 0 |
| 116 | 0 | 0 | 4 |
| 117 | 3 | 1 | 0 |
| 118 | 0 | 5 | 0 |
| 119 | 0 | 0 | 4 |
| 120 | 3 | 1 | 0 |
| 121 | 0 | 5 | 0 |
| 122 | 0 | 0 | 4 |
| 123 | 3 | 1 | 0 |
| 124 | 0 | 5 | 0 |
| 125 | 3 | 1 | 0 |
| 126 | 0 | 0 | 4 |
| 127 | 0 | 5 | 0 |
| 128 | 3 | 1 | 0 |
| 129 | 0 | 0 | 4 |
| 130 | 0 | 5 | 0 |
| 131 | 3 | 1 | 0 |
| 132 | 0 | 0 | 4 |
| 133 | 0 | 5 | 0 |
| 134 | 3 | 1 | 0 |
| 135 | 0 | 0 | 4 |
| 136 | 0 | 5 | 0 |
| 137 | 3 | 1 | 0 |
| 138 | 0 | 0 | 4 |
| 139 | 0 | 5 | 0 |
| 140 | 3 | 1 | 0 |
| 141 | 0 | 0 | 4 |
| 142 | 0 | 5 | 0 |
| 143 | 3 | 1 | 0 |
| 144 | 0 | 0 | 4 |
| 145 | 0 | 5 | 0 |
| 146 | 3 | 1 | 0 |
| 147 | 0 | 0 | 4 |
| 148 | 0 | 5 | 0 |
| 149 | 3 | 1 | 0 |
| 150 | 0 | 0 | 4 |
| 151 | 0 | 5 | 0 |
| 152 | 3 | 1 | 0 |
| 153 | 0 | 0 | 4 |
| 154 | 0 | 5 | 0 |
| 155 | 3 | 1 | 0 |
| 156 | 0 | 0 | 4 |

-continued

| i | j = 1 | j = 2 | j = 3 |
|---|---|---|---|
| 157 | 0 | 5 | 0 |
| 158 | 3 | 1 | 0 |
| 159 | 0 | 0 | 4 |
| 160 | 0 | 5 | 0 |
| 161 | 3 | 1 | 0 |
| 162 | 0 | 0 | 4 |
| 163 | 0 | 5 | 0 |
| 164 | 3 | 1 | 0 |
| 165 | 0 | 0 | 4 |
| 166 | 0 | 5 | 0 |
| 167 | 3 | 1 | 0 |
| 168 | 0 | 0 | 4 |
| 169 | 0 | 5 | 0 |
| 170 | 3 | 1 | 0 |
| 171 | 0 | 0 | 4 |
| 172 | 0 | 5 | 0 |
| 173 | 3 | 1 | 0 |
| 174 | 0 | 0 | 4 |
| 175 | 0 | 5 | 0 |
| 176 | 3 | 1 | 0 |
| 177 | 0 | 0 | 4 |
| 178 | 0 | 5 | 0 |
| 179 | 3 | 1 | 0 |
| 180 | 0 | 0 | 4 |
| 181 | 0 | 5 | 0 |
| 182 | 3 | 1 | 0 |
| 183 | 0 | 0 | 4 |
| 184 | 0 | 5 | 0 |
| 185 | 3 | 1 | 0 |
| 186 | 0 | 0 | 4 |
| 187 | 0 | 5 | 0 |
| 188 | 3 | 1 | 0 | where i is the interleaver size index, i=1, 2, 3, ..., 187, 188, and i is determined in dependence upon an interleaver size K based on the following table:

| i | $K_i$ |
|---|---|
| 1 | 40 |
| 2 | 48 |
| 3 | 56 |
| 4 | 64 |
| 5 | 72 |
| 6 | 80 |
| 7 | 88 |
| 8 | 96 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 216 |
| 24 | 224 |
| 25 | 232 |
| 26 | 240 |
| 27 | 248 |
| 28 | 256 |
| 29 | 264 |
| 30 | 272 |
| 31 | 280 |
| 32 | 288 |
| 33 | 296 |
| 34 | 304 |
| 35 | 312 |
| 36 | 320 |
| 37 | 328 |
| 38 | 336 |
| 39 | 344 |
| 40 | 352 |
| 41 | 360 |
| 42 | 368 |
| 43 | 376 |
| 44 | 384 |
| 45 | 392 |
| 46 | 400 |
| 47 | 408 |
| 48 | 416 |
| 49 | 424 |
| 50 | 432 |
| 51 | 440 |
| 52 | 448 |
| 53 | 456 |
| 54 | 464 |
| 55 | 472 |
| 56 | 480 |
| 57 | 488 |
| 58 | 496 |
| 59 | 504 |
| 60 | 512 |
| 61 | 528 |
| 62 | 544 |
| 63 | 560 |
| 64 | 576 |
| 65 | 592 |
| 66 | 608 |
| 67 | 624 |
| 68 | 640 |
| 69 | 656 |
| 70 | 672 |
| 71 | 688 |
| 72 | 704 |
| 73 | 720 |
| 74 | 736 |
| 75 | 752 |
| 76 | 768 |
| 77 | 784 |
| 78 | 800 |
| 79 | 816 |
| 80 | 832 |
| 81 | 848 |
| 82 | 864 |
| 83 | 880 |
| 84 | 896 |
| 85 | 912 |
| 86 | 928 |
| 87 | 944 |
| 88 | 960 |
| 89 | 976 |
| 90 | 992 |
| 91 | 1008 |
| 92 | 1024 |
| 93 | 1056 |
| 94 | 1088 |
| 95 | 1120 |
| 96 | 1152 |
| 97 | 1184 |
| 98 | 1216 |
| 99 | 1248 |
| 100 | 1280 |
| 101 | 1312 |
| 102 | 1344 |
| 103 | 1376 |
| 104 | 1408 |
| 105 | 1440 |
| 106 | 1472 |
| 107 | 1504 |
| 108 | 1536 |
| 109 | 1568 |
| 110 | 1600 |
| 111 | 1632 |
| 112 | 1664 |
| 113 | 1696 |

-continued

| i | $K_i$ |
|---|---|
| 114 | 1728 |
| 115 | 1760 |
| 116 | 1792 |
| 117 | 1824 |
| 118 | 1856 |
| 119 | 1888 |
| 120 | 1920 |
| 121 | 1952 |
| 122 | 1984 |
| 123 | 2016 |
| 124 | 2048 |
| 125 | 2112 |
| 126 | 2176 |
| 127 | 2240 |
| 128 | 2304 |
| 129 | 2368 |
| 130 | 2432 |
| 131 | 2496 |
| 132 | 2560 |
| 133 | 2624 |
| 134 | 2688 |
| 135 | 2752 |
| 136 | 2816 |
| 137 | 2880 |
| 138 | 2944 |
| 139 | 3008 |
| 140 | 3072 |
| 141 | 3136 |
| 142 | 3200 |
| 143 | 3264 |
| 144 | 3328 |
| 145 | 3392 |
| 146 | 3456 |
| 147 | 3520 |
| 148 | 3584 |
| 149 | 3648 |
| 150 | 3712 |
| 151 | 3776 |
| 152 | 3840 |
| 153 | 3904 |
| 154 | 3968 |
| 155 | 4032 |
| 156 | 4096 |
| 157 | 4160 |
| 158 | 4224 |
| 159 | 4288 |
| 160 | 4352 |
| 161 | 4416 |
| 162 | 4480 |
| 163 | 4544 |
| 164 | 4608 |
| 165 | 4672 |
| 166 | 4736 |
| 167 | 4800 |
| 168 | 4864 |
| 169 | 4928 |
| 170 | 4992 |
| 171 | 5056 |
| 172 | 5120 |
| 173 | 5184 |
| 174 | 5248 |
| 175 | 5312 |
| 176 | 5376 |
| 177 | 5440 |
| 178 | 5504 |
| 179 | 5568 |
| 180 | 5632 |
| 181 | 5696 |
| 182 | 5760 |
| 183 | 5824 |
| 184 | 5888 |
| 185 | 5952 |
| 186 | 6016 |
| 187 | 6080 |
| 188 | 6144. |

22. The method of claim 12, comprised of interleaving each of the sub-blocks of coded bits by using a quadratic permutation polynomial (QPP) interleaver.

23. A wireless terminal in a communication system, comprising:
  a channel encoder encoding at least one block of information bits to be transmitted to generate a plurality of coded bits;
  a bit separation unit segmenting the plurality of coded bits into a plurality of sub-blocks of coded bits;
  a plurality of interleavers interleaving each of the sub-blocks of coded bits;
  a circular buffer having a plurality of redundancy versions, with each redundancy version corresponding to a starting bit index in the circular buffer;
  a bit collection unit collecting the interleaved coded bits from the plurality of sub-blocks and writing the collected bits into the circular buffer;
  a bit selection unit selecting a subset of bits from the circular buffer by selecting a redundancy version from among the plurality of redundancy version;
  a modulation unit modulating the subset of bits by using a certain modulation scheme; and
  at least one antenna transmitting the modulated bits, with, in at least one pair of redundancy versions, the number of bits between the starting point of a first redundancy version and the starting point of a second redundancy version being not divisible by the modulation order of the certain modulation scheme.

24. A wireless terminal in a communication system, comprising:
  at least one antenna receiving a plurality of blocks of data bits;
  a de-modulation unit de-modulating the plurality of blocks of data bits by using a certain modulation scheme;
  a circular buffer having a plurality of redundancy versions, with each redundancy version corresponding to a starting bit index in the circular buffer;
  a bit de-selection unit writing the plurality of blocks of de-modulated bits into the circular buffer, with each block of de-modulated bits being written in accordance with a redundancy version selected from among the plurality of redundancy versions;
  a bit separation unit segmenting the bits written into the circular buffer into a plurality of sub-blocks of bits;
  a plurality of interleaver interleaving each of the sub-blocks of bits by using a certain interleaver;
  a bit collection unit collecting the interleaved bits from the plurality of sub-blocks to generate a collected block of bits; and
  a channel decoding unit decoding the collected block of bits by using a certain decoding scheme, with, in at least one pair of redundancy versions, the number of bits between the starting point of a first redundancy version and the starting point of a second redundancy version being not divisible by the modulation order of the certain modulation scheme.

* * * * *